United States Patent
Kim et al.

(10) Patent No.: US 11,216,154 B2
(45) Date of Patent: Jan. 4, 2022

(54) ELECTRONIC DEVICE AND METHOD FOR EXECUTING FUNCTION ACCORDING TO STROKE INPUT

(71) Applicant: Samsung Electronics Co., Ltd., Suwon-si (KR)

(72) Inventors: Jieun Kim, Suwon-si (KR); Jongkee Lee, Suwon-si (KR); Eunbi Kim, Suwon-si (KR); Soojung Lee, Suwon-si (KR); Jueun Lee, Suwon-si (KR); Shinjae Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 15/733,284

(22) PCT Filed: Dec. 10, 2018

(86) PCT No.: PCT/KR2018/015606
§ 371 (c)(1),
(2) Date: Jun. 19, 2020

(87) PCT Pub. No.: WO2019/124841
PCT Pub. Date: Jun. 27, 2019

(65) Prior Publication Data
US 2020/0319848 A1    Oct. 8, 2020

(30) Foreign Application Priority Data
Dec. 22, 2017 (KR) .......................... 10-2017-0178776

(51) Int. Cl.
*G06F 3/0481* (2013.01)
*G06F 3/0482* (2013.01)
(Continued)

(52) U.S. Cl.
CPC ........ *G06F 3/04817* (2013.01); *G06F 3/0482* (2013.01); *G06F 3/0488* (2013.01); *G06F 3/167* (2013.01)

(58) Field of Classification Search
CPC .... G06F 3/0488; G06F 3/167; G06F 3/04817; G06F 3/0482; G06F 3/04883
See application file for complete search history.

(56) References Cited

U.S. PATENT DOCUMENTS

| 8,478,349 B2 | 7/2013 | Seo et al. |
| 2009/0002332 A1* | 1/2009 | Park ...................... G06F 3/0488 345/173 |

(Continued)

FOREIGN PATENT DOCUMENTS

| KR | 10-2010-0070733 A | 6/2010 |
| KR | 10-2010-0131605 A | 12/2010 |

(Continued)

OTHER PUBLICATIONS

International Search Report and Written Opinion of the International Searching Authority in connection with International Application No. PCT/KR2018/015606 dated Mar. 19, 2019, 13 pages.

*Primary Examiner* — Mong-Shune Chung

(57) ABSTRACT

An electronic device is disclosed. The electronic device, according to one embodiment, disclosed in the present document, comprises at least one sensor, a display, a speaker, and a processor functionally connected to the at least one sensor and the display, wherein the processor can be configured so as to output, on the display, a plurality of menu icons respectively having a sequence number, detect a stroke input by using the at least one sensor, confirm a movement direction and a movement frequency corresponding to the detected stroke input, designate, from a reference menu icon among the plurality of menu icons, a menu icon according to a result of movements in the movement direc- (Continued)

tion at the movement frequency, and output information of the designated menu icon through the speaker. Additional various embodiments identified through the description are possible.

15 Claims, 15 Drawing Sheets

(51) Int. Cl.
*G06F 3/0488* (2013.01)
*G06F 3/16* (2006.01)

(56) References Cited

U.S. PATENT DOCUMENTS

| | | | |
|---|---|---|---|
| 2010/0162155 A1 | 6/2010 | Hwangbo et al. | |
| 2014/0240262 A1* | 8/2014 | Paul | G06F 3/0488 |
| | | | 345/173 |
| 2014/0337806 A1* | 11/2014 | Benko | G06F 3/017 |
| | | | 715/863 |
| 2016/0209975 A1* | 7/2016 | Hong | G06F 3/0488 |

FOREIGN PATENT DOCUMENTS

| | | |
|---|---|---|
| KR | 10-1372753 B1 | 3/2014 |
| KR | 10-2014-0106801 A | 9/2014 |
| KR | 10-2015-0081140 A | 7/2015 |
| KR | 10-1678220 B1 | 11/2016 |

* cited by examiner

ELECTRONIC DEVICE AND METHOD FOR EXECUTING FUNCTION ACCORDING TO STROKE INPUT

CROSS-REFERENCE TO RELATED APPLICATIONS

This application is a 371 National Stage of International Application No. PCT/KR2018/015606, filed Dec. 10, 2018, which claims priority to Korean Patent Application No. 10-2017-0178776, filed Dec. 22, 2017, the disclosures of which are herein incorporated by reference in their entirety.

BACKGROUND

1. Field

Embodiments disclosed in the disclosure relate to a function recognition technology based on a user input when an electronic device executes a voice assist function.

2. Description of Related Art

An electronic device may provide an accessibility mode for differently setting an access scheme for a desired user (e.g., a person with low-vision, a visually-impaired or hearing-impaired person, and the like). For example, an electronic device in which a voice assist function is set through the accessibility mode sequentially moves to a next region while providing information (e.g., voice guidance) on a certain region of a display (touchscreen), and provides information on the moved region.

SUMMARY

As described above, in an accessibility mode, a region may be specified while moving a region by one unit in one direction, so that a lot of time and effort of a user are repeatedly consumed until the user accesses a desired region from an arbitrary region. For example, in a state in which a first (top left) menu icon is specified among 4×4 menu icons on a screen of a display, there was a problem that all 15 menu icons had to be passed to specify the last menu icon.

Various embodiments disclosed in the disclosure provides an electronic device and a method for executing a function based on a stroke input thereof in which, when a voice assist function that outputs audio information associated with a specified item is executed, specifying of a menu icon at a specific position based on the stroke input, and a change of the menu icon from a current position to a specific position may be facilitated, or a function associated with the menu icon at the specific position may be executed easily and rapidly.

An aspect of the disclosure provides an electronic device including at least one sensor, a touchscreen display, a speaker, and a processor operatively connected to the at least one sensor and the touchscreen display, wherein the processor may output a plurality of menu icons respectively having sequence numbers on the touchscreen display, sense a stroke input using at least one of the at least one sensor and the touchscreen display, identify a movement direction and the number of movements on a screen output on the touchscreen display in response to the sensed stroke input, specify a menu icon corresponding to a result of moving by the number of movements from a reference menu icon among the plurality of menu icons in the movement direction, and output information of the specified menu icon through the speaker.

Another aspect of the disclosure provides a method for executing, by at least one processor, a function based on a stroke input including outputting a plurality of menu icons respectively having sequence numbers on a touchscreen display, sensing the stroke input using at least one of at least one sensor and the touchscreen display, identifying a movement direction and the number of movements on a screen output on the touchscreen display in response to the sensed stroke input, specifying a menu icon corresponding to a result of moving by the number of movements from a reference menu icon among the plurality of menu icons in the movement direction, and outputting information of the specified menu icon through a speaker.

According to embodiments disclosed in the disclosure, user convenience for specifying or executing a desired function in a state in which the voice assist function is executed may be improved. In addition, various effects that may be directly or indirectly identified through the disclosure may be provided.

DETAILED DESCRIPTION

Figure 1:
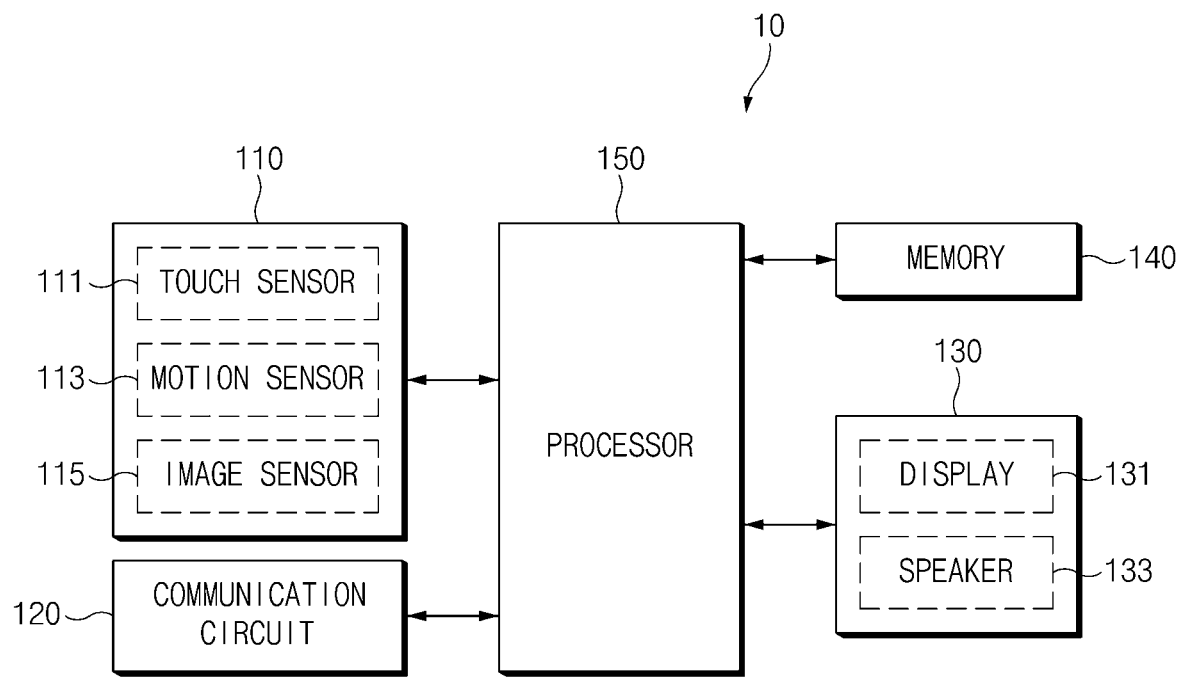
FIG. 1 shows a block diagram of an electronic device according to one embodiment.

With reference to the description of the drawings, the same or similar reference numerals may be used for the same or similar components.

Hereinafter, various embodiments of the disclosure may be described with reference to accompanying drawings. Accordingly, those of ordinary skill in the art will recognize that modification, equivalent, and/or alternative on the various embodiments described herein may be variously made without departing from the scope and spirit of the disclosure.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even when terms are terms which are defined in the disclosure, they may not be interpreted to exclude embodiments of the disclosure.

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

The electronic devices according to various embodiments disclosed in the disclosure may be various types of devices. An electronic device 10 may include, for example, at least one of a portable communication device (e.g., a smartphone and a tablet), a computer device, a portable multimedia device, a portable medical device, a camera, a wearable device (e.g., a smart watch), and a home appliance device. The electronic device according to the embodiment of the disclosure is not limited to the aforementioned devices.

FIG. 1 shows a block diagram of an electronic device according to an embodiment.

Referring to FIG. 1, according to an embodiment, the electronic device 10 may include at least one sensor 110, a communication circuit 120, an output device 130, a memory 140, and a processor 150. In one embodiment, some components may be omitted or additional components may be further included. In one embodiment, some of the components may be combined with each other to be formed as one entity, but may perform functions of the corresponding components before combining in the same manner. An input/output relationship shown in FIG. 1 may be only an example for convenience of description, and the disclosure may not be limited thereto.

According to an embodiment, the at least one sensor 110 may include, for example, a touch sensor 111. The touch sensor 111 may sense a touch input by an external object (e.g., a user's hand). The touch sensor may be disposed, for example, above or below a touchscreen (e.g., 121). According to various embodiments, at least one of an image sensor 115 and a motion sensor 113 may be further included. The image sensor 115 may sense a motion input by the external object. The image sensor 115 may sense a motion of the external object with respect to a direction including, for example, a direction of a front face of a display 131. The motion sensor 113 may sense a motion of the electronic device 10. The motion sensor 113 may include, for example, at least one of a gyro sensor and an angular velocity sensor.

According to an embodiment, the communication circuit 120 may include a GPS circuit capable of receiving a current position (e.g., a GPS coordinate). The communication circuit 120 may include a circuit for communication with an external electronic device (e.g., a TV). For example, the communication circuit may include a circuit for communication such as a Bluetooth, a WiFi, a WiFi direct, and the like.

According to an embodiment, the output device 130 may include the display 131 capable of outputting an image and a speaker 133 capable of outputting sound. The display 131 may include, for example, a liquid crystal display (LCD), a light emitting diode (LED) display, an organic light emitting diode (OLED) display, or an electronic paper display. The display 131 may, for example, display various contents (e.g., a text, an image, a video, an icon, and/or a symbol) to the user. The display 131 may be the touchscreen display 131. In the disclosure, the display 131 will be described as the touchscreen display as an example.

The memory 140 may be a volatile memory (e.g., RAM and the like), a non-volatile memory (e.g., a ROM, a flash memory, and the like) or a combination thereof. The memory 140 may store, for example, a command or data associated with at least one of other components of the electronic device 10. According to an embodiment, the memory 140 may include instructions for determining an execution function corresponding to an input (e.g., a stroke input, the motion input, and the like) by the external object in a specified mode (e.g., a stroke input mode). For example, the memory 140 may store a reference coordinate table for recognizing a type of the stroke input. The reference coordinate table may contain, for example, each touch coordinate value corresponding to each type of the stroke input. In another example, the memory 140 may include at least one of each instruction corresponding to each stroke input and each instruction corresponding to each stroke input and motion input.

The processor 150 may include, for example, at least one of a central processing unit (CPU), a graphics processing unit (GPU), a microprocessor, an application processor, an application specific semiconductor (ASIC), and a field programmable gate array (FPGA), and may have a plurality of cores. The processor 150 may execute operations or data processing associated with control and/or communication of at least one of other components of the electronic device 10 using the instructions stored in the memory 140. According to an embodiment, the processor 150 may output a plurality of menu icons respectively having sequence numbers on the display 131, sense the stroke input using the at least one sensor 110, identify a movement direction and the number of movements corresponding to the sensed stroke input, specify a menu icon (hereinafter referred to as a 'menu icon corresponding to the stroke input'), which is a result of moving by the number of movements in the movement direction from a reference menu icon, among the plurality of menu icons, and output information of the specified menu icon through the speaker 133.

According to an embodiment, when sensing a specified motion of the external object (e.g., the user's hand) using the at least one sensor 110, the processor 150 may switch a mode to a stroke input mode for receiving the stroke input (or execute the stroke input function). The specified motion may include, for example, a long press (touch) motion of a specified region in the display 131 for a first specified time (e.g., about 2 seconds). The specified motion may be, for example, a motion of tapping (or double tapping) an arbitrary region or the specified region of the display 131. The processor 150 may sense the stroke input using the at least one sensor 110 (e.g., the touch sensor, the image sensor, or the like) in the stroke input mode. In the disclosure, a case in which the processor 150 senses the stroke input and the specified motion using the touch sensor 111 will be described as an example. According to various embodiments, the mode may be switched to the stroke input mode when the specified motion is sensed while a voice assist function is executed through an accessibility mode. When the mode is switched to the stroke input mode, the processor 150 may output, through the speaker 133, that the mode is switched to the stroke input mode.

According to an embodiment, when sensing the stroke input in the stroke input mode, the processor 150 may identify the type of the stroke input. For example, the processor 150 may compare a touch coordinate value corresponding to the sensed stroke input with each touch coordinate value based on the stroke input of each type in the reference coordinate table stored in the memory 140, and identify a type of the stroke input as the comparison result. The stroke input may include, for example, at least one of a type for specifying the menu icon (e.g., a first or a second stroke input), a type for changing and specifying the menu icon (e.g., the first or the second stroke input), a type for executing the specified application (e.g., a third stroke input), and a type for executing an application with a high frequency of use (e.g., a fourth stroke input).

According to an embodiment, when sensing the first stroke input in a state in which a screen containing the plurality of menu icons (e.g., a home screen) is displayed on the display 131, the processor 150 may identify the reference menu icon, and a movement direction and the number of movements corresponding to the first stroke input. The first stroke input may contain, for example, at least one of a number and a special character (e.g., +, −). The sequence numbers of the plurality of menu icons (or the sequence numbers respectively corresponding to the plurality of menu icons) may increase, for example, sequentially in a specified rule (e.g., from top to bottom and left to right).

According to an embodiment, when a previously specified menu icon is present among the plurality of menu icons, the processor 150 may determine the previously specified menu icon as the reference menu icon. In addition, when there is no previously specified menu icon among the plurality of menu icons, the processor 150 may determine a menu icon of a first sequence number among the plurality of menu icons as the reference icon.

According to an embodiment, the processor 150 may determine whether the first stroke input contains an input for specifying a direction (e.g., + or −), and when the first stroke input contains the input for specifying the direction, determine the direction based on the input as the movement direction. For example, the processor 150 may determine the movement direction as a direction in which the sequence number increases when + is contained in the first stroke input, and determine the movement direction as a direction in which the sequence number decreases when − is contained in the first stroke input. When the input for specifying the direction is not contained in the first stroke input, the processor 150 may determine the movement direction as the direction in which the sequence number increases.

According to an embodiment, when information corresponding to the number is contained in the stroke input, the processor 150 may determine the number, or a number obtained by adding or subtracting a specified number (e.g., 1) to or from the number as the number of movements. For example, when there is no specified menu icon among the plurality of menu icons, the processor 150 may determine a menu icon, which is a result of moving in the movement direction by a number of subtracting 1 from the number included in the first stroke input from the reference menu icon as the specified menu icon. In another example, when the specified menu icon is present among the plurality of menu icons, the processor 150 may determine a menu icon, which is a result of moving by the number contained in the first stroke input from the specified menu icon as the specified menu icon.

According to an embodiment, the processor 150 may output information of the menu icon specified based on the stroke input among the plurality of menu icons through the speaker 133. The processor 150 may display the specified menu icon in a highlighted form on the display 131.

According to an embodiment, when sensing the first stroke input containing a plurality of numbers, the processor 150 may execute a function specified with respect to the plurality of numbers. For example, when sensing the first stroke input containing a three-digit number '112', the processor 150 may make an emergency call corresponding to the three-digit number '112'.

According to an embodiment, when sensing the second stroke input containing an alphabet or a Hangul initial consonant in a state in which the screen containing the plurality of menu icons is displayed on the display 131, the processor 150 may identify at least one menu icon starting with the alphabet or the Hangul initial consonant among the plurality of menu icons, and determine one of the at least one menu icon as the specified menu icon. For example, the processor 150 may determine a first menu icon among the at least one menu icon starting with the alphabet or the Hangul initial consonant corresponding to the second stroke input as the specified menu icon. In another example, when the previously specified menu icon is present among the at least one menu icon corresponding to the second stroke input, for example, when the second stroke input containing the same alphabet or Hangul initial consonant input multiple times, the processor 150 may determine a menu icon having a sequence number immediately following a sequence number of the previously specified menu icon as the specified menu icon based on the second stroke input. In another example, when sensing a swipe motion input subsequent to the second stroke input, the processor 150 may determine a menu icon having a sequence number immediately preceding (when a direction of the swipe motion input is a direction in which the sequence number decreases) or immediately following (when the direction of the swipe motion input is a direction in which the sequence number increases) the sequence number of the menu icon (e.g., the first menu icon among the at least one menu icon) to be specified corresponding to the second stroke input as the specified menu icon. The swipe motion input may include, for example, a motion of moving at least one finger in a movement direction (e.g., a direction in which the sequence number increases or decreases).

According to an embodiment, when sensing the third stroke input or the fourth stroke input containing the special symbol, the processor 150 may execute an application or a function corresponding to the sensed third stroke input or fourth stroke input. For example, when sensing the third stroke input containing a first special symbol (e.g., '?'), the processor 150 may execute an app finder. The app finder may be an application that recognizes a user's voice and searches for a function or an application corresponding to the recognized voice. In another example, when sensing the third stroke input containing a second special symbol (e.g., '☆', '♡', or the like), the processor 150 may make a call to a representative contact number registered as 'favorite'. In another example, when sensing the third stroke input containing a third special symbol (e.g., '!'), the processor 150 may specify or execute a menu icon corresponding to an application with the highest recent frequency of use.

According to an embodiment, the processor 150 may sense the stroke input and then senses the motion input of the external object using the at least one sensor 110, and specify or execute the menu icon specified using the stroke input based on the motion input. According to an embodiment, when the first stroke input is sensed and the motion input is not sensed for a critical time (e.g., 10 seconds), the processor 150 may specify the menu icon corresponding to the first stroke input and then output the information of the specified menu icon through the speaker 133. According to an embodiment, when the first stroke input is sensed and a first motion (e.g., the double tap) is sensed within the critical time, the processor 150 may specify the menu icon corresponding to the first stroke input without waiting for the critical time and then execute an application corresponding to the specified menu icon.

According to an embodiment, when sensing the swipe motion input after sensing the first stroke input, the processor 150 may determine a menu icon having an immediately preceding sequence number or an immediately following sequence number in a direction based on a first swipe motion input from the menu icon corresponding to the first stroke input as the specified menu icon. The swipe motion may include, for example, a motion input for moving (e.g., dragging) a finger used for the first stroke input in the direction of increasing or decreasing the sequence number.

According to an embodiment, when sensing the swipe motion input after the first stroke input, the processor 150 may differently execute the function based on a change in an area (a sensed area) of the first stroke input and the swipe motion input. For example, when an area difference between an area of the external object at a time of the first stroke input and an area of the external object at a time of the motion input is equal to or greater than a threshold area, the processor 150 may immediately execute the specified menu icon without outputting the information of the specified menu icon, specify the menu icon having the sequence number immediately preceding or immediately following the sequence number of the specified menu icon, or execute page movement of the screen to correspond to the first stroke input. The area difference may occur, for example, when the first stroke input is performed with an index finger of the user and then the motion input is performed with the index finger and a middle finger (or a palm). The critical area may be experimentally determined based on, for example, an area of a thumb and the middle finger (an area of the palm). In another example, when a sense area based on the swipe motion is equal to or greater than a specified area, the processor 150 may execute the page movement, and otherwise, may perform execution associated with the menu icon (e.g., immediately executing of the specified menu icon or specifying of the menu icon of the immediately following sequence number). According to various embodiments, when the motion input is performed using a finger different from the finger at the time of the first stroke input, the processor 150 may immediately execute the specified menu icon, specify the menu icon having the sequence number immediately preceding or immediately following the sequence number of the specified menu icon, or execute the page movement of the screen to correspond to the first stroke input. In this case, the processor 150 may identify, for example, a motion finger change after the first stroke input using the image sensor 115.

According to an embodiment, the processor 150 may execute one of the menu icon movement and the page movement based on the movement direction of the swipe motion input after the first stroke input. For example, when the first stroke input '3' is sensed and then the swipe motion input in a horizontal direction (e.g., right to left or left to right) is sensed in the state in which there is no specified menu icon among the plurality of menu icons, the processor 150 may specify a menu icon of an immediately preceding or immediately following sequence number in the horizontal direction from a third menu icon based on the first stroke input. In another example, when the first stroke input '3' is sensed and then the swipe motion input in a vertical direction (e.g., from top to bottom or from bottom to top) is sensed in a state in which a screen of a first page among a plurality of pages is displayed on the display 131, the processor 150 may execute the page movement to a third page and then output information of the moved page through the speaker 133.

According to an embodiment, when sensing the second stroke input and identifying that a motion change of the electronic device 10 is a specified change, the processor 150 may execute different functions depending on the movement direction. For example, when sensing the second stroke input 'A' and then sensing a movement in an x-axis direction (+ or −) of the electronic device 10, the processor 150 may execute an application specified for the 'A'. Further, when sensing a movement in a y-axis direction (+ or −) of the electronic device 10 in a state in which the specified application is executed, the processor 150 may execute a specified function for the specified application. In this case, the processor 150 may sense the motion change of the electronic device 10 using the motion sensor 113.

According to an embodiment, the processor 150 may identify the current position using the communication circuit 120, and when identifying that the current position is a specified place at a time of executing the voice assist function, output a guide voice indicating that the current position is the specified position through the speaker 133. For example, the processor 150 may output the guide voice when the mode is switched to the stroke input mode, and output the guide voice regardless of whether the mode is switched to the stroke input mode when the voice assist function is executed. In another example, the processor 150 may output the guide voice such as "The current position is a bus stop and the stroke input will be performed on the home screen".

According to an embodiment, when the current position is the specified place, the processor 150 may execute a function (or an app) corresponding to the stroke input differently from a case where the current position is not the specified place. For example, when not being at the specified place, and when sensing the second stroke input, the processor 150 may specify one menu icon starting with the alphabet or the Hangul initial consonant based on the second stroke input among the plurality of menu icons displayed on the display 131. In another example, when sensing the second stroke input (e.g., the stroke input containing the alphabet or the Hangul initial consonant) in a company, the processor 150 may execute an application specified with respect to the company among applications corresponding to the second stroke input. In another example, when sensing the second stroke input at the bus stop, the processor 150 may execute an application specified with respect to the bus stop among the applications corresponding to the second stroke input. In the above-described embodiment, the processor 150 may guide information of the application after the execution of the specified application.

According to an embodiment, when the second stroke input is sensed in a state in which the electronic device 10 is in communication connection (e.g., Bluetooth pairing) with the external electronic device, the processor 150 may execute a function corresponding to the second stroke input associated with the external electronic device. According to an embodiment, when the second stroke input containing the alphabet or the Hangul initial consonant is sensed in a state in which the electronic device 10 is in communication connection with a refrigerator, the processor 150 may instruct search of food information (or a food recipe) starting with the corresponding alphabet or Hangul initial consonant in a food list (or a recipe list) stored in (a memory of) the refrigerator. In this case, the refrigerator may output the information of the food (or the recipe) starting with the alphabet or Hangul initial consonant to the display provided or transmit the information to the electronic device 10. According to an embodiment, when the second stroke input containing the alphabet or the Hangul initial consonant is sensed in a state in which the electronic device 10 is in communication connection with an external speaker device, the processor 150 may specify music starting with the corresponding alphabet or Hangul initial consonant stored in the electronic device 10 and then output specified music information through the speaker 133. According to an embodiment, when the second stroke input containing the alphabet or the Hangul initial consonant is sensed in a state in which the electronic device 10 is in connection with the TV, the processor 150 may specify a TV content starting with the corresponding alphabet or Hangul initial consonant and then output information of the specified content through the speaker 133. When the first stroke input containing the number is sensed, the processor 150 may specify a channel movement function corresponding to the number and output the fact that the channel movement function has been specified through the speaker 133. According to an embodiment, when the second stroke input containing the alphabet or the Hangul initial consonant is sensed in a state in which the electronic device 10 is in connection with an external memory, the processor 150 may specify a file starting with the corresponding alphabet or Hangul initial consonant among files stored in the external memory and output specified file information through the speaker 133. According to an embodiment, when the first stroke input containing the number is sensed and then the swipe motion (e.g., swipe from top to bottom or swipe from bottom to top) is sensed in a state in which the electronic device 10 is in connection with an air conditioner, the processor 150 may increase or decrease a temperature or a wind intensity by the number corresponding to the first stroke input. Additionally or alternatively, when the special symbol (e.g., →, ←, ↑, ↓, or the like) is input in a state in which the electronic device 10 is in connection with the air conditioner, the processor 150 may adjust a wind direction (e.g., wind in a right direction, wind in a left direction, wind in an upward direction, and wind in a downward direction) to correspond to the input special symbol. According to an embodiment, when the stroke input 'C' is sensed in a state in which the electronic device 10 is in connection with the external electronic device through wireless communication, the processor 150 may refresh (stop and then resume) the wireless communication connection between the external electronic device and the electronic device 10. According to an embodiment, when the electronic device 10 is in communication connection with the PC, for example, when the electronic device 10 is used as an input device of the PC, the processor 150 may specify or execute one of a plurality of menu icons displayed on the PC using the stroke input. For example, when sensing the second stroke input containing the alphabet or the Hangul initial consonant, the processor 150 may execute a program corresponding to the alphabet or the Hangul initial consonant among programs on the PC. In another example, when sensing the second stroke input containing the alphabet or the Hangul initial consonant in a state in which a specific web page is displayed on a web browser on the PC, the processor 150 may specify a word or a function starting with the alphabet or the Hangul initial consonant in the web page being displayed. In another example, the processor 150 may instruct the PC to specify or change the file in response to the first stroke input with respect to a program (e.g., my computer) in a foreground state on the PC.

According to an embodiment, the processor 150 may differently execute the function (e.g., the specifying of the menu icon, the execution of the application, and the like) corresponding to the stroke input depending on the application being executed. For example, when sensing the second stroke input 'M' in a state in which a message app is executed, the processor 150 may search for a message containing the alphabet 'M'. In another example, when sensing the second stroke input 'M' in a state in which a gallery app is executed, the processor 150 may search for a local tag or a photo/video containing the alphabet 'M'. In another example, when sensing the second stroke input 'M' in a state in which an email app is executed, the processor 150 may include a mail containing the alphabet 'M'. In another example, when sensing the second stroke input 'x2' in a state in which the web browser connected to the specific web page is executed, the processor 150 may execute a double speed voice guidance function for information on the web page. In the above-described embodiment, the processor 150 may output the searched or specified information (e.g., the message, the mail, the photo/video, and the double speed voice guidance function) through the speaker 133.

According to an embodiment, when sensing the stroke input in a state in which a specific event occurs, the processor 150 may execute a function specified for the stroke input among functions corresponding to the event. For example, when receiving the second stroke input 'o' in a state in which a text message is received, the processor 150 may execute a function 'reply' for the text message. In another example, when sensing the second stroke input 'X' when a call is received, the processor 150 may execute a function of 'rejecting the call and sending an out-of-office text message'.

According to an embodiment, the processor 150 may differently execute the function based on the stroke input depending on a current time. For example, the processor 150 may recognize that the first stroke input is for specifying or changing the menu icon in the morning time, and recognize that the first stroke input is for the page movement in the afternoon time.

According to an embodiment, when executing the voice assist function including the stroke input mode, the processor 150 may output at least one of screen information displayed on the display 131, information of the application being executed, and event occurrence information through the speaker 133. For example, when there is an application being executed in the foreground state, the processor 150 may output information of the application being executed through the speaker 133. When the application is executed, the processor 150 may output the information of the application being executed through the speaker 133. In another example, the processor 150 may output the information (e.g., a page sequence number, information on the menu icon on the screen, and the like) of the screen being displayed on the display 131 through the speaker 133. In another example, when the specified event (e.g., reception of the text message or reception of the call) occurs, the processor 150 may output a guide voice for the occurrence of the specified event through the speaker 133. In another example, when a function (e.g., an app corresponding to the specified menu icon) is executed through the stroke input, for example, when a double tap input is sensed after the menu icon is specified, the processor 150 may execute the app and guide information (e.g., a name or a function of the app) on the app being executed through the speaker 133.

In the above-described embodiments, the processor 150 may determine whether the stroke input is sensed for a second specified time, for example, 5 minutes after the mode is switched to the stroke input mode, and when the stroke input is not sensed for the second specified time, switch the mode from the stroke input mode to a normal input mode. The normal input mode may be, for example, a touch input mode.

According to the above-described embodiments, the electronic device 10 may sequentially or randomly select the menu icons on the screen using the stroke input, thereby improving a convenience of selecting the menu icon particularly for a user familiar with arrangement of the menu icons on the screen.

According to an embodiment, an electronic device (e.g., the electronic device 10 in FIG. 1) may include at least one sensor (e.g., the sensor 110 in FIG. 1), a touchscreen display (e.g., the display 131 in FIG. 1), a speaker (e.g., the speaker 133 in FIG. 1), and a processor (e.g., the processor 150 in FIG. 1) operatively connected to the at least one sensor and the touchscreen display. The processor may output a plurality of menu icons respectively having sequence numbers on the touchscreen display, sense a stroke input using at least one of the at least one sensor and the touchscreen display, identify a movement direction and the number of movements on a screen output on the touchscreen display in response to the sensed stroke input, specify a menu icon corresponding to a result of moving by the number of movements from a reference menu icon among the plurality of menu icons in the movement direction, and output information of the specified menu icon through the speaker.

The processor may switch a mode to a stroke input mode when sensing a specified motion input of an external object using at least one of the at least one sensor and the touchscreen display, and sense the stroke input using at least one of the at least one sensor and the touchscreen display in the stroke input mode.

The processor may determine whether there is a previously specified menu icon among the plurality of menu icons, and determine a first menu icon among the plurality of menu icons as the reference menu icon when there is no previously specified menu icon.

The processor may determine whether there is a previously specified menu icon among the plurality of menu icons, and determine the previously specified menu icon as the reference menu icon when the previously specified menu icon is present.

The processor may determine whether there is no previously specified menu icon among the plurality of menu icons when information corresponding to a number is contained in the stroke input, determine a result of subtracting a specified number from the number as the number of movements when there is no previously specified menu icon, and determine the number as the number of movements when the previously specified menu icon is present.

The processor may, when the sensed stroke input contains information for specifying the movement direction, differently apply the movement direction based on the information for specifying the movement direction.

The processor may further, when the sensed stroke input contains an alphabet or a Hangul initial consonant, identify at least one menu icon starting with the alphabet or the Hangul initial consonant among the plurality of menu icons, and determine one of the at least one menu icon as the specified menu icon.

The processor may, when a previously specified menu icon is present among the at least one menu icon, determine a menu icon of a following sequence number of the previously specified menu icon among the at least one menu icon as the specified menu icon.

The processor may execute a function corresponding to the specified menu icon when sensing a motion input of an external object after sensing the stroke input, and output audio information associated with the function through the speaker.

The processor may, when sensing a first motion input of an external object after sensing the stroke input, change the specified menu icon in response to the first motion input and output information of the changed menu icon.

The processor may, when the plurality of menu icons are menu icons contained in one of a plurality of pages respectively having different sequence numbers, and when sensing a second motion input of an external object after sensing the stroke input, display, on the display, a page corresponding to a result of moving by the number of movements based on the at least one input in a movement direction based on the second motion input, and output information of the displayed page through the speaker.

The processor may selectively execute at least one of specifying a menu icon or moving a page based on a change in sense area between the stroke input and the second motion input or the movement direction of the second motion input.

Figure 2:
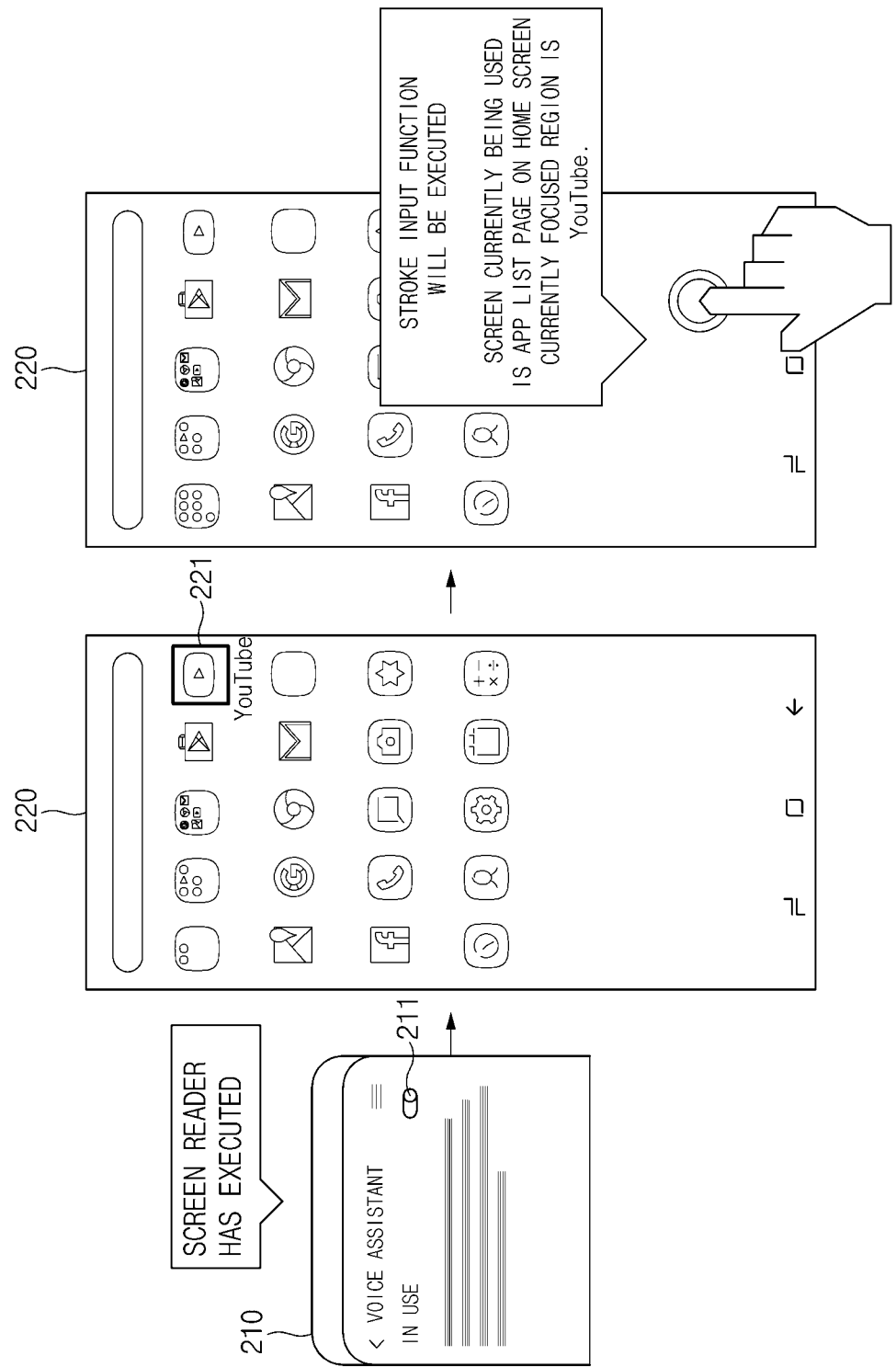
FIG. 2 shows an UI screen of a stroke input mode switching process according to one embodiment.

FIG. 2 shows an UI screen of a stroke input mode switching process according to one embodiment.

Referring to FIG. 2, in a screen 210, when execution of a voice assist function (e.g., manipulation of an icon 211) in the accessibility mode is requested, a processor (e.g., 150 in FIG. 1) may guide the execution of the voice assist function through the speaker 133.

As in a screen 220, the processor 150 may sense a specified motion in a state in which one menu icon (e.g., 'YouTube') 221 is specified among a plurality of menu icons on the display 131 as in a screen 220. The specified motion may include, for example, the long press motion of the specified region in the display 131 for the first specified time. In this case, the processor 150 may sense the specified motion using a touch sensor (e.g., 111 in FIG. 1). In another example, the specified motion may include a motion in which the external object takes a specified motion (e.g., a motion of clenching and opening a fist) in a state of being spaced from a display (e.g., 131 in FIG. 1). In this regard, the processor 150 may sense the specified motion using the image sensor 115. In another example, the specified motion may include a specified motion in which the external object moves an electronic device (e.g., 10 in FIG. 1) in a specified rule. In this case, the processor 150 may sense the specified motion using a motion sensor (e.g., 113 in FIG. 1).

When sensing the specified motion, the processor 150 may switch the mode to the stroke input mode for receiving the stroke input. When the mode is switched to the stroke input mode, the processor 150 may output information on a screen currently being displayed on the display 131 through the speaker 133. For example, the processor 150 may output, through the speaker 133, information about which page the screen currently being displayed on the display 131 corresponds to among screens (e.g., the home screen) containing the menu icon. Additionally, the processor 150 may output that the mode is switched to the stroke input mode through the speaker 133. In another example, the processor 150 may output a guide voice, such as "The stroke input function will be executed. The screen currently being used is an app list page on the home screen. A currently focused region is 'YouTube'."

According to an embodiment, the stroke input may be sensed when the voice assist function is set in the accessibility mode. Therefore, a process of setting the voice assist function for the stroke input will be omitted in a following description of an embodiment of the disclosure.

Figure 3:
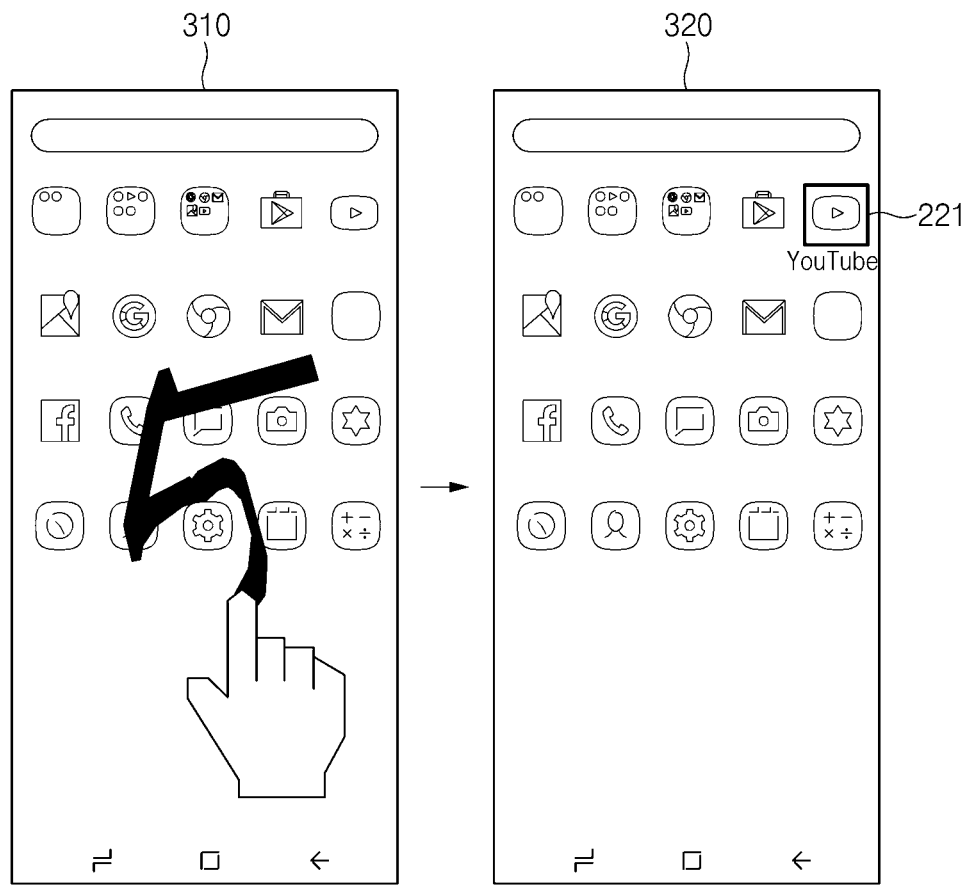
FIG. 3 shows a UI screen of a function execution process based on a first stroke input, according to one embodiment.

FIG. 3 shows a UI screen of a function execution process based on a first stroke input, according to one embodiment.

Referring to FIG. 3, in a screen 310, in a state in which a plurality of menu icons are displayed on a display (e.g., 131 in FIG. 1), a processor (e.g., 150 in FIG. 1) may sense the first stroke input, which is an input of a number '5'. The processor 150 may output, through a speaker (e.g., 133 in FIG. 1), information of the stroke input thus input, for example, a guide voice indicating that the number 5 is input. Because there is no specified (e.g., highlighted) menu icon on the screen containing the plurality of menu icons, the processor 150 may determine a first menu icon as a reference menu icon.

In a screen 320, when sensing the input of the number '5', the processor 150 may determine a fifth menu icon on the screen as the specified menu icon. For example, the processor 150 may identify 4 obtained by subtracting 1 from the sensed number as the number of movements, and determine a fifth menu icon 321, the menu icon with a sequence number difference of 4 sequence number from the first menu icon (the reference menu icon) as the specified menu icon. The processor 150 may output information (e.g., a name of the fifth menu icon and the like) of the fifth menu icon on the screen through the speaker 133. The processor 150 may highlight (e.g., outline and the like) the specified menu icon and display the highlighted icon on the display 131.

Figure 4:
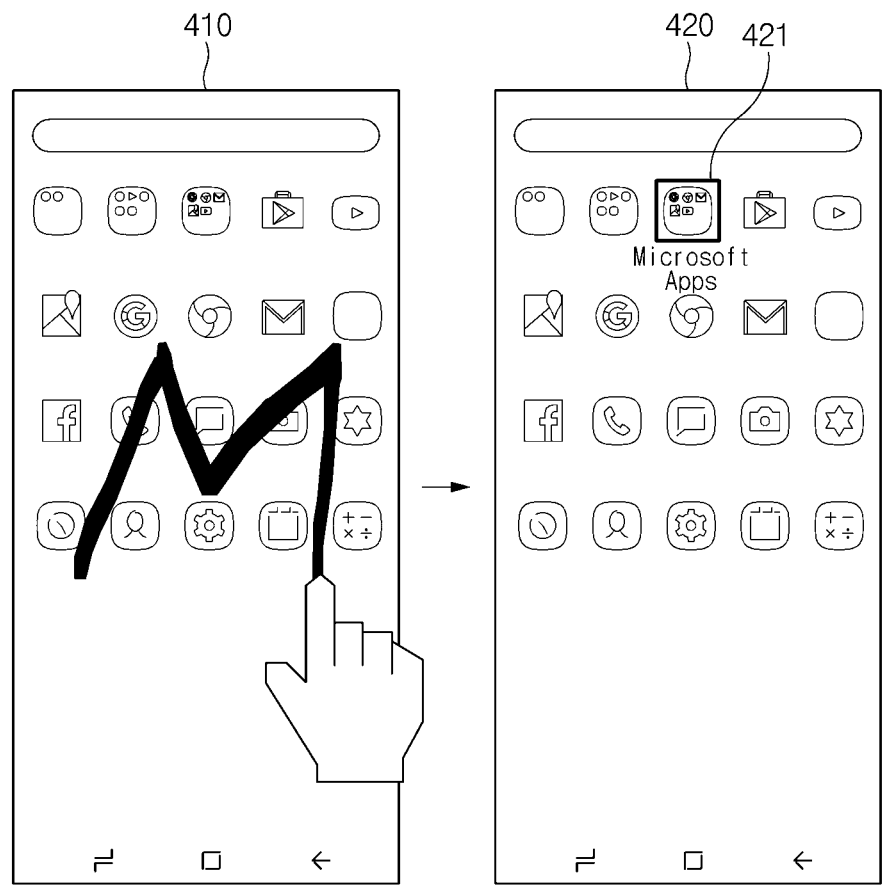
FIG. 4 shows a UI screen of a function execution process based on a second stroke input, according to one embodiment.

FIG. 4 shows a UI screen of a function execution process based on a second stroke input, according to one embodiment.

Referring to FIG. 4, in a screen 410, a processor (e.g., 150 in FIG. 1) may sense the second stroke input, which is the input of the alphabet 'M', in a state in which a plurality of menu icons are displayed on a display (e.g., 131 in FIG. 1). The processor 150 may identify that there is no specified menu icon among the plurality of menu icons. The processor 150 may output information of the stroke input thus input, for example, a guide voice indicating that the alphabet 'M' has been input through the speaker 133.

In a screen 420, because there is no specified menu icon among the plurality of menu icons, the processor 150 may determine a first icon 'Microsoft Apps' 421 starting with the alphabet 'M' as the specified menu icon. The processor 150 may output information of the specified menu icon, for example, a guide voice indicating that the specified menu icon is the 'Microsoft Apps' through the speaker 133. The processor 150 may highlight (e.g., outline and the like) the specified menu icon and display the highlighted specified menu icon on the display 131.

In FIG. 4, menu icons starting with the alphabet 'M' among the plurality of menu icons may include four menu icons of 'Microsoft Apps', 'Maps', 'Messages', and 'mySamsung'. When sensing the second stroke input, which is the 'M' input, or sensing a first swipe input in a state in which the menu icon starting with the alphabet 'M' is specified, the processor 150 may specify a menu icon having a sequence number immediately following a sequence number of the specified menu icon among the four menu icons. The first swipe input may include, for example, an input of dragging in a direction to be moved (e.g., left to right or right to left) using one finger.

Figure 5:
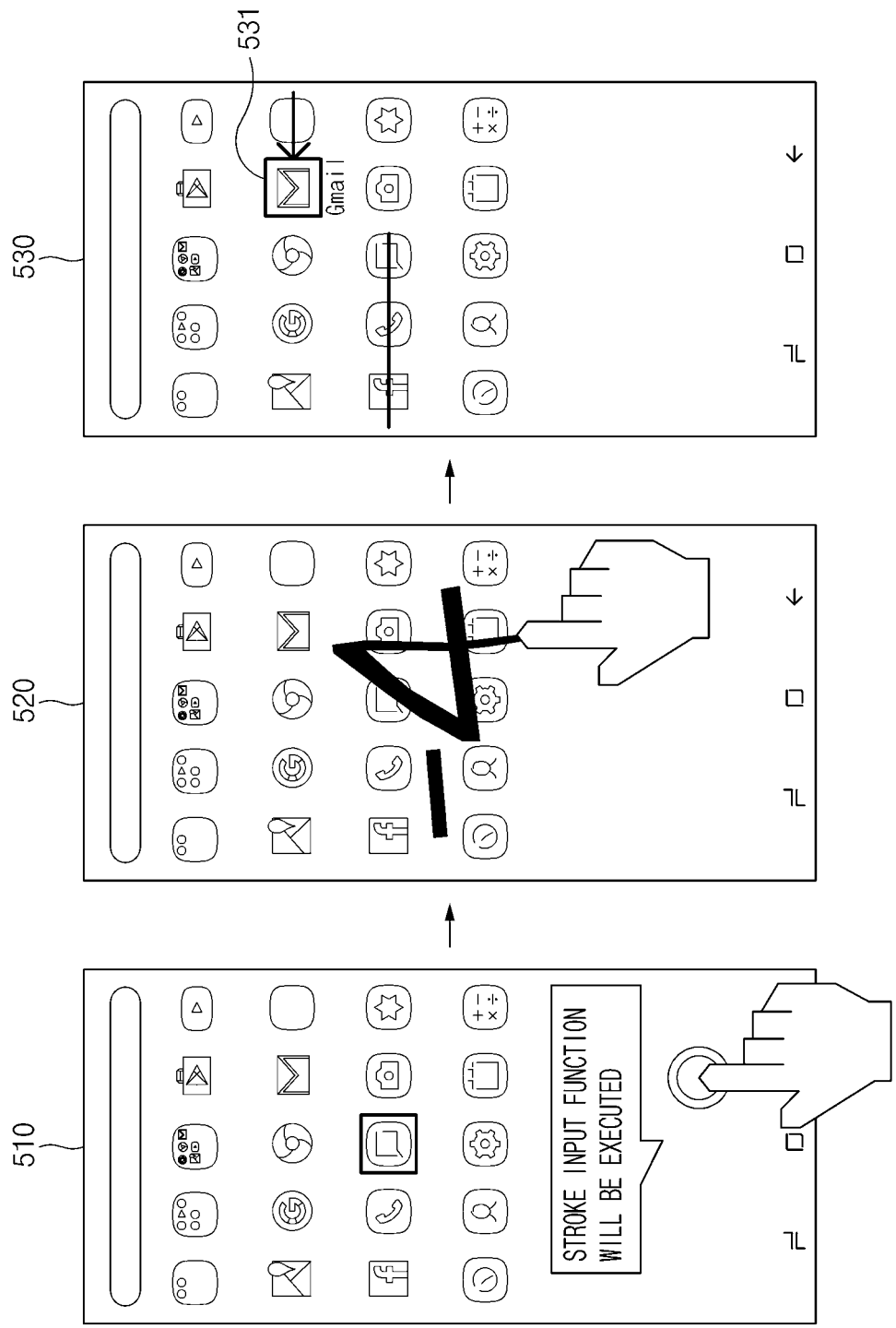
FIG. 5 shows a UI screen of a function execution process based on a first stroke input when a specified menu icon is present, according to one embodiment.

FIG. 5 shows a UI screen of a function execution process based on a first stroke input when a specified menu icon is present, according to one embodiment.

Referring to FIG. 5, in a screen 510, a processor (e.g., 150 in FIG. 1) may sense a specified motion in a state in which a 'Messages' menu icon is specified. When sensing the specified motion, the processor 150 may switch the mode to the stroke input mode for receiving the stroke input. The processor 150 may output the fact that the mode is switched to the stroke input mode through the speaker 133.

In a screen 520, the processor 150 may receive the first stroke input '−4'. The processor 150 may output information of the stroke input thus input through the speaker 133. When the first stroke input '−4' is input, the processor 150 may identify from '−' that a movement direction is a direction in which the sequence number decreases, and identify from '4' that the movement is performed by 4 sequence number.

In a screen 530, the processor 150 may determine a menu icon 'Gmail' 531 that is 4 sequence numbers ahead of the specified menu icon 'Messages' (the reference menu icon) as the specified menu icon. The processor 150 may output information of the specified menu icon, for example, a guide voice indicating that the specified menu icon is the "Gmail" through a speaker (e.g., 133 in FIG. 1). The processor 150 may highlight (e.g., outline and the like) the specified menu icon and display the highlighted specified menu icon on a display (e.g., 131 in FIG. 1).

Figure 6:
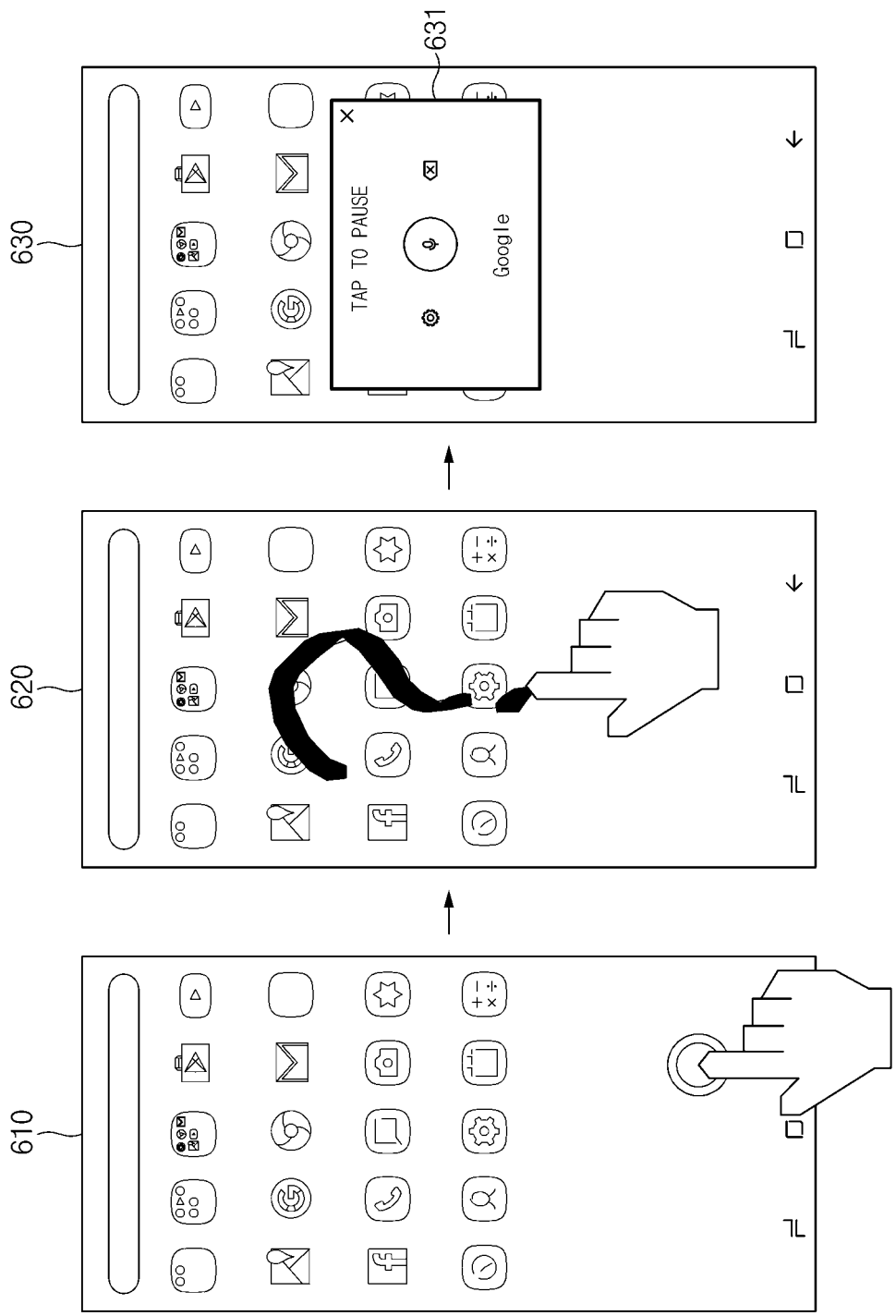
FIG. 6 shows a UI screen of a function execution process based on a third stroke input, according to one embodiment.

FIG. 6 shows a UI screen of a function execution process based on a third stroke input, according to one embodiment.

Referring to FIG. 6, in a screen 610, a processor (e.g., 150 in FIG. 1) may sense a specified motion in a state in which at least one menu icon is output through a display (e.g., 131 in FIG. 1). When sensing the specified motion, the processor 150 may switch the mode to the stroke input mode and may guide that the mode is the stroke input mode through a speaker (e.g., 133 in FIG. 1).

In a screen 620, the processor 150 may sense that the third stroke input '?' is input in the stroke input mode. The third stroke input may include, for example, an input of requesting execution of a specified application with respect to the stroke input. The processor 150 may output a guide voice indicating that the stroke input '?' is sensed through the speaker 133.

In a screen 630, the processor 150 may execute a specified application 'app finder' 631 with respect to the stroke input '?'. The app finder 631 may be an application that, for example, recognizes a voice of the user and searches for a function or an application corresponding to the recognized voice. When the app finder 631 is executed, the processor 150 may output, through the speaker 133, at least one of information indicating that the app finder is executed or an app that is desired to be searched is able to be input.

Figure 7:
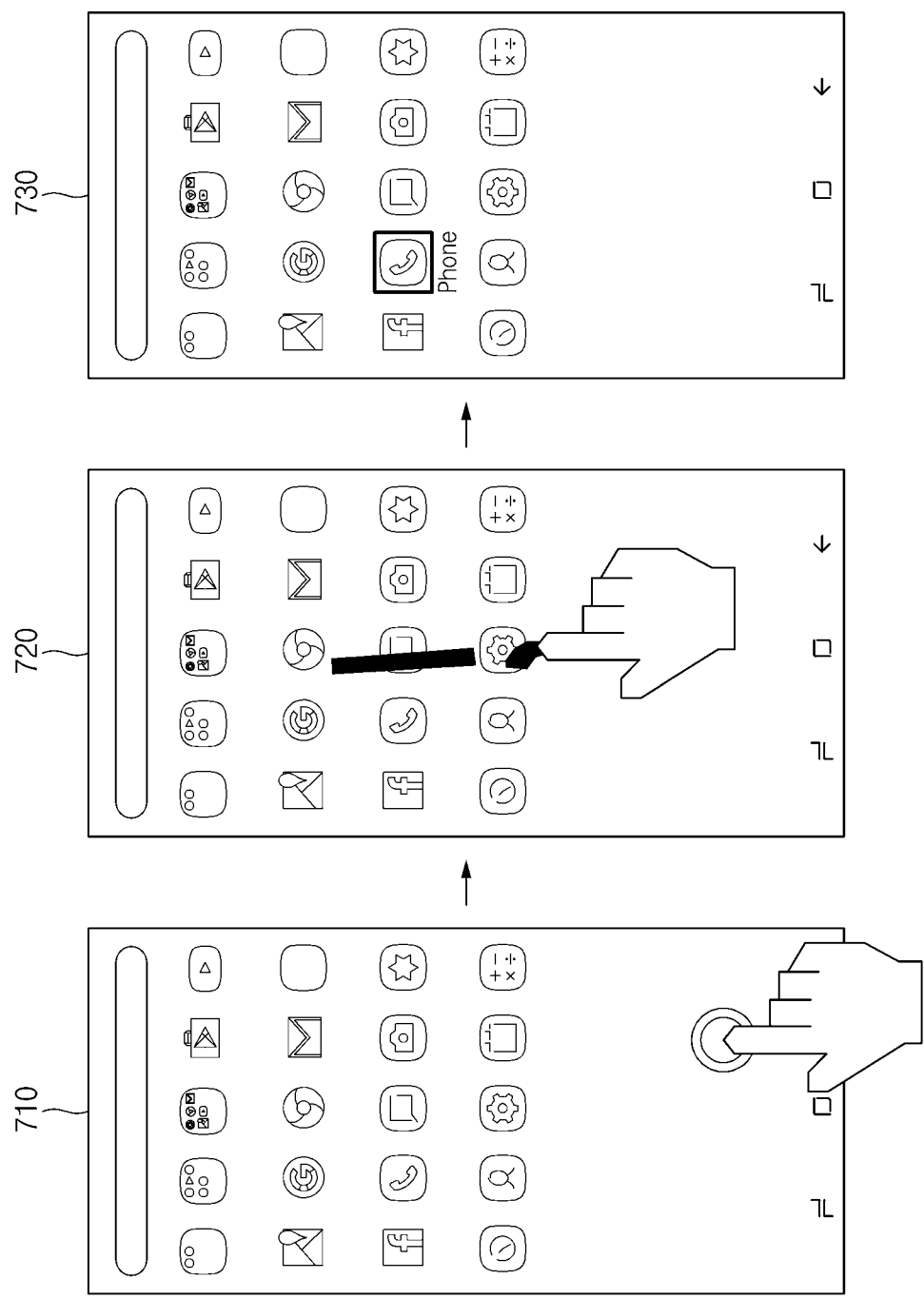
FIG. 7 shows a UI screen of a function execution process based on a fourth stroke input, according to one embodiment.

FIG. 7 shows a UI screen of a function execution process based on a fourth stroke input, according to one embodiment.

Referring to FIG. 7, in a screen 710, a processor (e.g., 150 in FIG. 1) may sense a specified motion in a state in which a plurality of menu icons are output through a display (e.g., 131 in FIG. 1). When sensing the specified motion, the processor 150 may switch the mode to the stroke input mode, and guide that the mode is the stroke input mode through a speaker (e.g., 133 in FIG. 1).

In a screen 720, the processor 150 may sense that the fourth stroke input '!' is input in the stroke input mode. The fourth stroke input may include, for example, an input requesting execution of an application with the highest recent frequency of use. The processor 150 may output a guide voice indicating that the stroke input '!' is sensed through the speaker 133.

In a screen 730, when sensing the fourth stroke input '!', the processor 150 may identify the application with the highest recent frequency of use, and specify a menu icon 'Phone' corresponding to the identified application. According to various embodiments, when the fourth stroke input is re-input in a state in which the menu icon corresponding to the fourth stroke input is specified, the processor 150 may specify an application with a second highest frequency of use following the specified menu icon. The processor 150 may output information of the specified menu icon or the application through the speaker 133.

Figure 8:
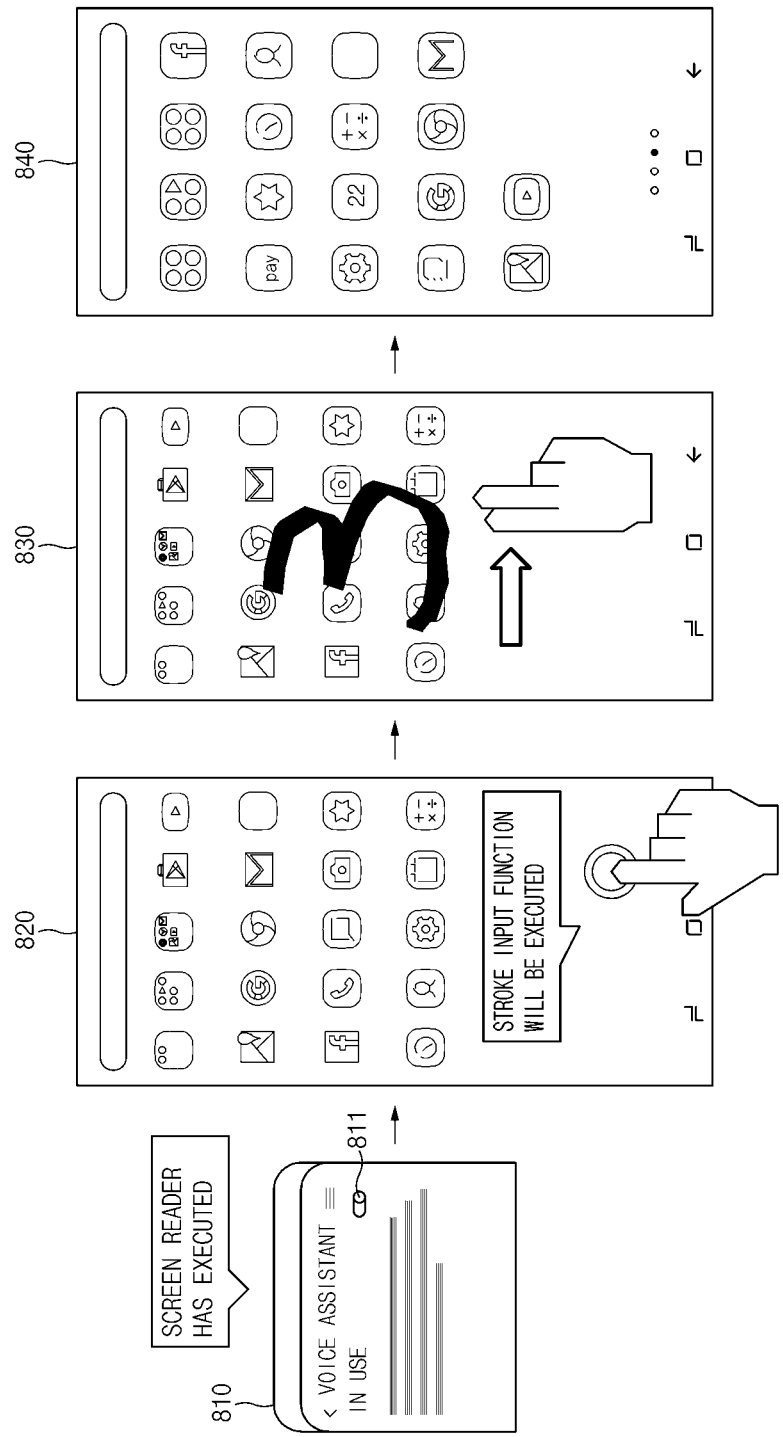
FIG. 8 shows a UI screen of a function execution process based on a first stroke input and a second swipe motion input, according to one embodiment.

FIG. 8 shows a UI screen of a function execution process based on a first stroke input and a second swipe motion input, according to one embodiment.

Referring to FIG. 8, in a screen 810, when execution of a voice assist function (e.g., manipulation of an icon 811) is requested in the accessibility mode, a processor (e.g., 150 in FIG. 1) may guide the execution of the voice assist function through a speaker (e.g., 133 in FIG. 1).

In a screen 820, when receiving a specified motion, the processor 150 may switch the mode to the stroke input mode for receiving the stroke input. The specified motion may include, for example, a long press (touch) motion of a specified region (e.g., a lower region of the display 131) in a display (e.g., 131 in FIG. 1) for a first specified time (e.g., 3 seconds).

In a screen 830, the processor 150 may sense the first stroke input '3' in the stroke input mode, and then sense the second swipe motion input within the critical time. The second swipe motion input may include, for example, a motion of dragging from the right to the left (a direction to move the page) in a state in which the thumb and the index finger (or the palm) are touching the display 131. In this case, the processor 150 may determine the first stroke input '3' as a sequence number of a page to be moved.

In a screen 840, the processor 150 may move the page to a third page corresponding to the first stroke input '3'. The processor 150 may output a notification sound for the page movement through the speaker 133.

Figure 9:
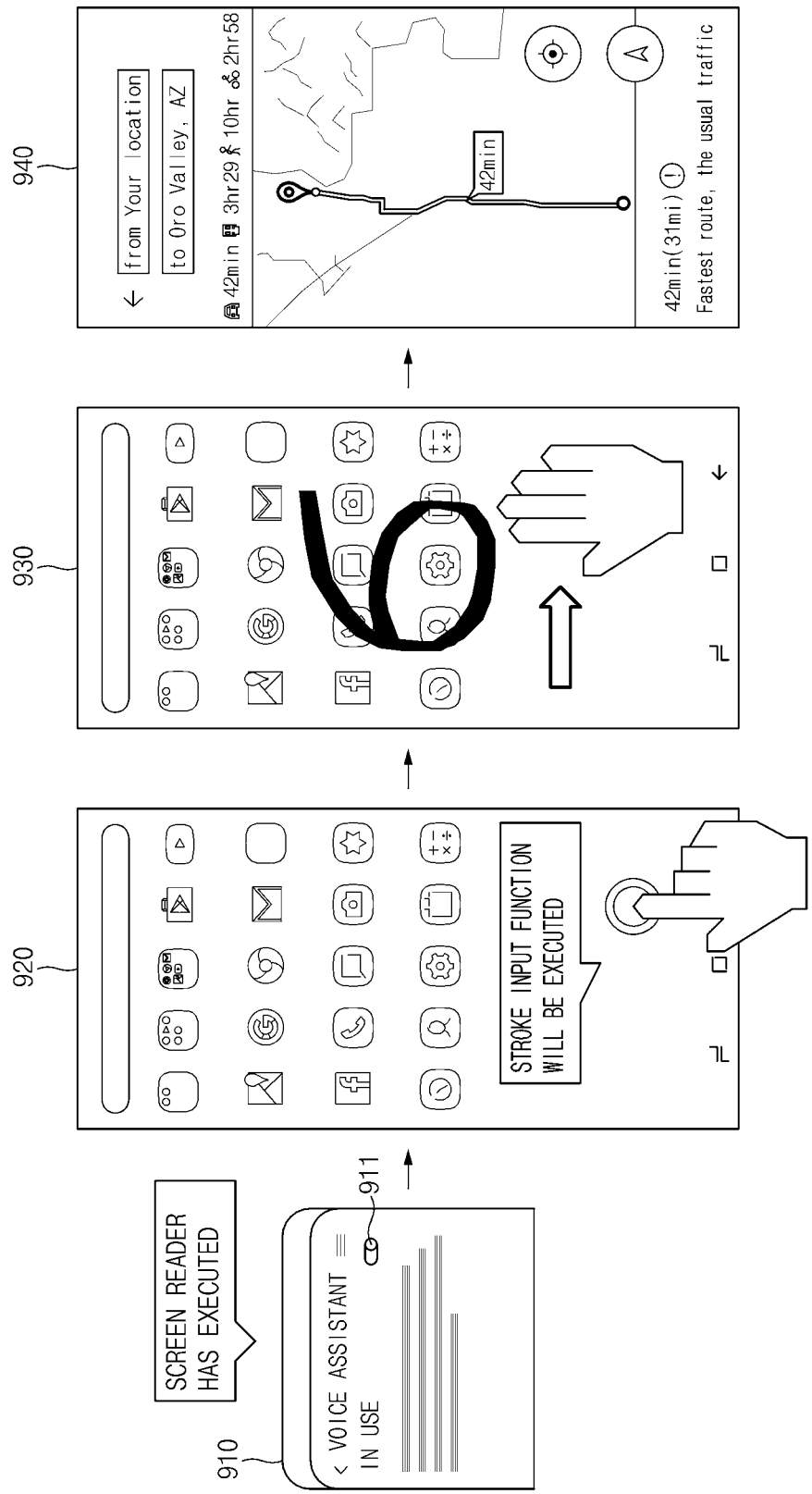
FIG. 9 shows a UI screen of a function execution process based on a first stroke input and a third swipe motion input, according to one embodiment.

FIG. 9 shows a UI screen of a function execution process based on a first stroke input and a third swipe motion input, according to one embodiment.

Referring to FIG. 9, in a screen 910, when execution of a voice assist function (e.g., manipulation of an icon 911) is requested in the accessibility mode, a processor (e.g., 150 in FIG. 1) may guide the execution of the voice assist function through a speaker (e.g., 133 in FIG. 1).

In a screen 920, when sensing a specified motion, the processor 150 may switch the mode to the stroke input mode for receiving the stroke input. The specified motion may include, for example, a long press (touch) motion of a specified region (e.g., the lower region of the display 131) in a display (e.g., 131 in FIG. 1) for a first specified time (e.g., 3 seconds).

In a screen 930, in a state in which the plurality of menu icons are displayed on the display 131 in the stroke input mode, the processor 150 may sense the first stroke input '6' and sense the third swipe motion input within the critical time. The third swipe motion input may be, for example, a motion of dragging from the right to the left in a state in which the palm is touching the display 131, which may be a motion requesting execution of the specified menu icon. When sensing the first stroke input '6' in the absence of the specified menu icon among the plurality of menu icons, the processor 150 may determine that the number of movements is 5 (=6−1) and the movement direction is the direction in which the sequence number increases.

In a screen 940, the processor 150 may immediately execute a sixth menu icon 'Maps' as a result of moving by 5 in the direction in which the sequence number increases from a first menu icon among the plurality of menu icons.

Figure 10:
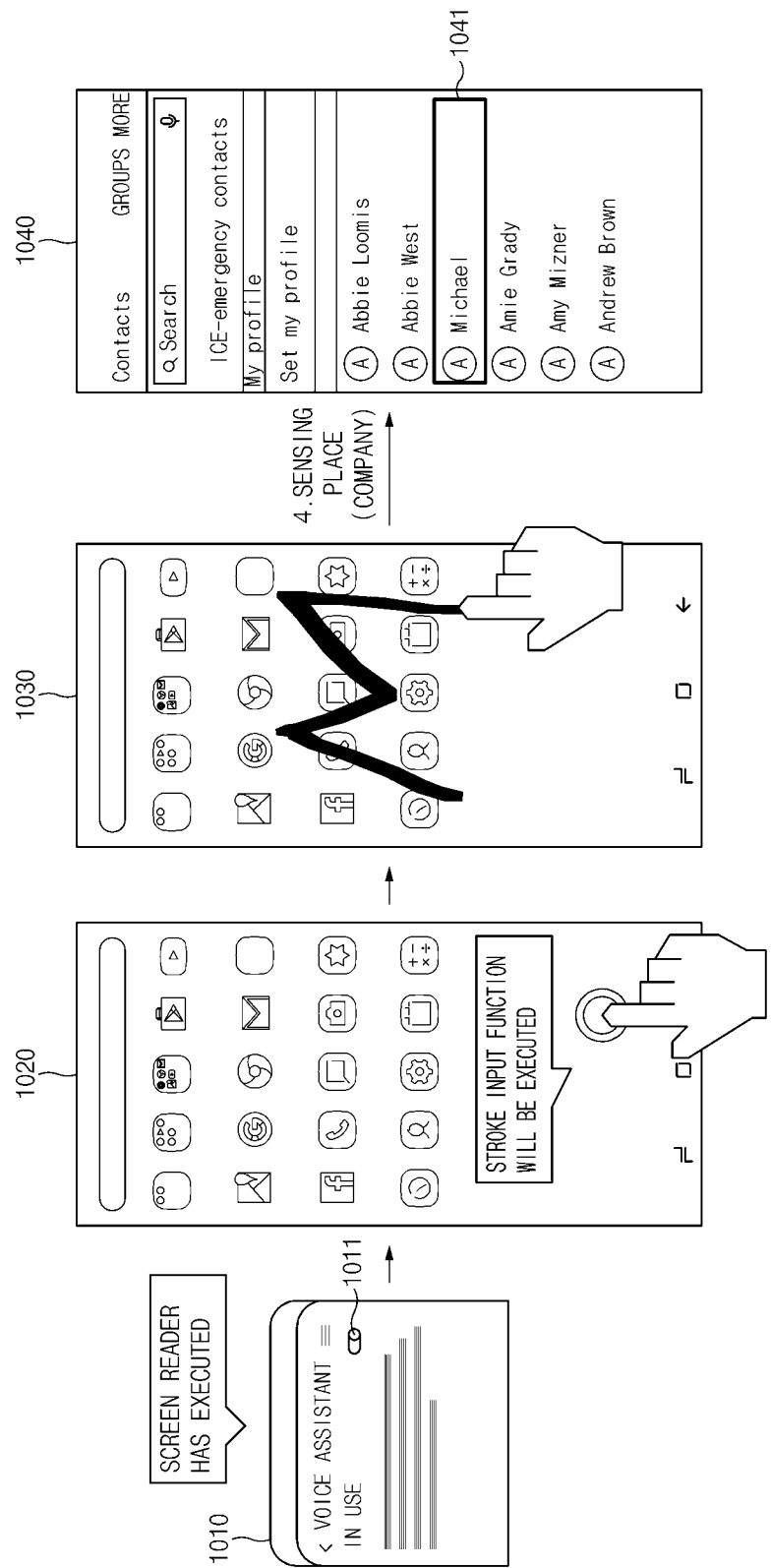
FIG. 10 shows a UI screen of a function execution process based on a place and a second stroke input, according to one embodiment.

FIG. 10 shows a UI screen of a function execution process based on a place and a second stroke input, according to one embodiment.

Referring to FIG. 10, in a screen 1010, when execution of a voice assist function (e.g., manipulation of an icon 1011) is requested in the accessibility mode, a processor (e.g., 150 in FIG. 1) may guide the execution of the voice assist function through a speaker (e.g., 133 in FIG. 1).

In a screen 1020, when sensing a specified motion, the processor 150 may switch the mode to the stroke input mode for receiving the stroke input. The specified motion may include, for example, a long press (touch) motion of a specified region (e.g., the lower region of the display 131) in a display (e.g., 131 in FIG. 1) for a first specified time (e.g., 3 seconds). The processor 150 may identify the current position using a communication circuit (e.g., 120 in FIG. 1) in the stroke input mode, and when the current position is the place specified with respect to the second stroke input, output a guide voice indicating that the current position is the specified place through the speaker 133.

In a screen 1030, the processor 150 may sense the second stroke input 'M' in the stroke input mode. The processor 150 may identify that there is a specified application for the second stroke input 'M' with respect to the specified place.

In a screen 1040, when sensing the second stroke input 'M', the processor 150 may execute an application specified for the current position among the applications specified for the 'M'. For example, the processor 150 may specify a first app icon 1041 starting with the 'M' from a list of the specified apps, and output information (e.g., a name) of a specified app icon.

Figure 11:
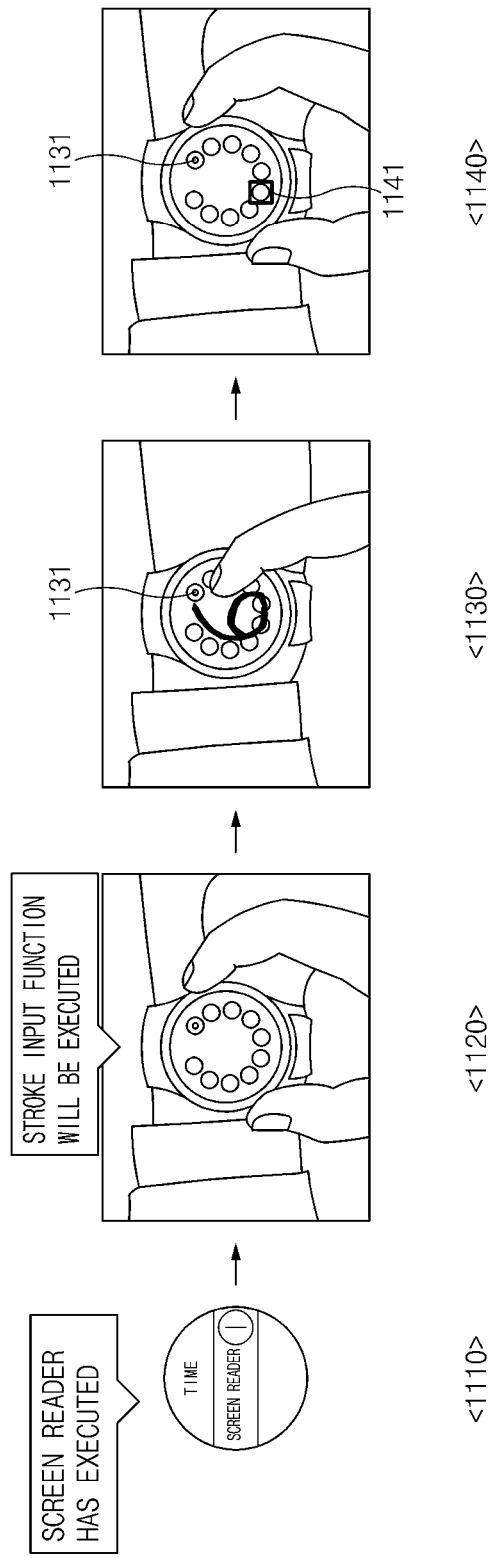
FIG. 11 shows a UI screen of a function execution process based on a stroke input in a smart watch environment, according to one embodiment.

FIG. 11 shows a UI screen of a function execution process based on a stroke input in a smart watch (e.g., 10 in FIG. 1) environment, according to one embodiment.

Referring to FIG. 11, in a screen 1110, when execution of a voice assist function (e.g., manipulation of an icon 1011) is requested in the accessibility mode, the processor (e.g., 150 in FIG. 1) may output a guide voice for guiding the execution of the voice assist function, for example, "Screen reader has been executed" through a speaker (e.g., 133 in FIG. 1).

In a screen 1120, when sensing a specified motion for a bezel of an electronic device (e.g., 10 in FIG. 1), the processor 150 may switch the mode to the stroke input mode. The specified motion may be, for example, a motion of rotating the bezel in a specified direction, a motion of pressing the bezel for a specified time, or the like. The processor 150 may output a guide voice indicating that the mode is switched to the stroke input mode, for example, "The stroke input function will be executed" through the speaker 133.

In a screen 1130, the processor 150 may sense the first stroke input '6' by the user using a touch sensor (e.g., 111 in FIG. 1). Because there is no specified menu icon and the movement direction is not included in the first stroke input, the processor 150 may determine a menu icon of a sequence number of 1 as the reference menu icon, determine the number of movements as 5(=6−1), and determine the movement direction as the direction in which the sequence number increases.

In a screen 1140, the processor 150 may determine a sixth menu icon 1141 as the specified menu icon as a result of moving by 5 from a first menu icon 1131 among the plurality of menu icons.

Figure 12:
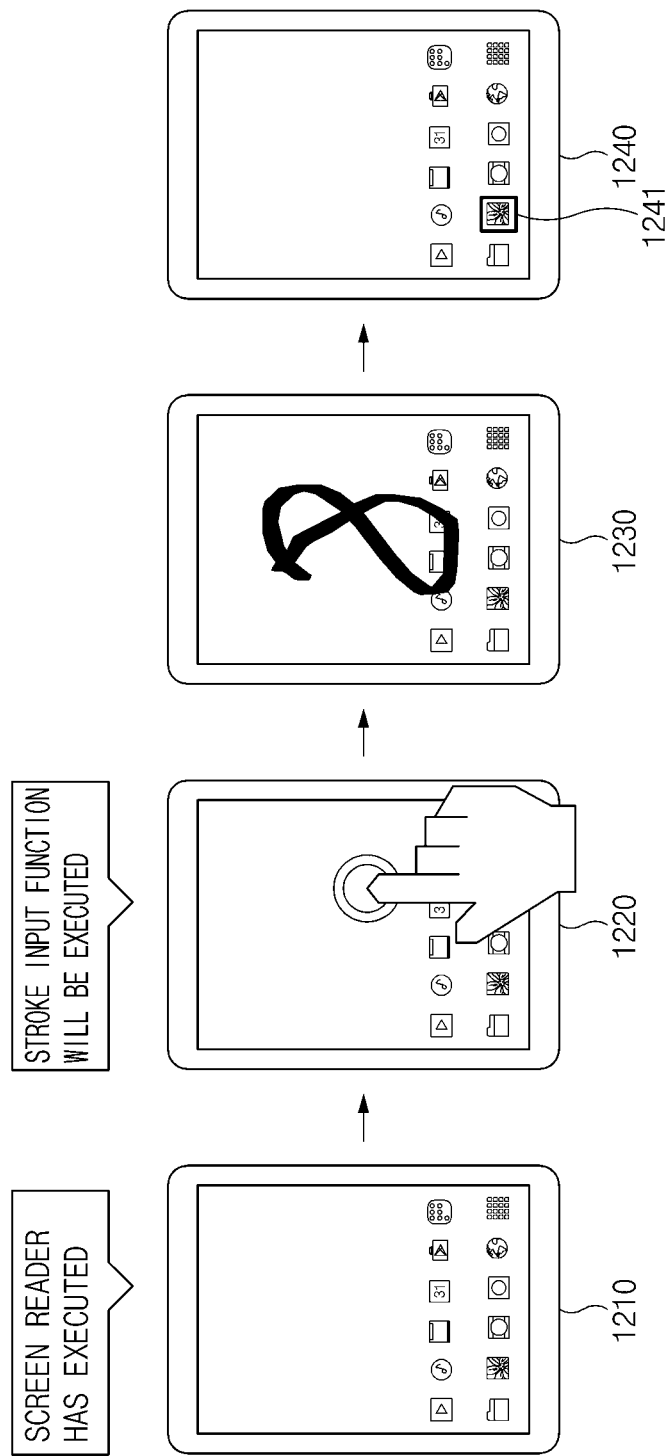
FIG. 12 shows a UI screen of a function execution process based on a stroke input in a tablet environment, according to one embodiment.

FIG. 12 shows a UI screen of a function execution process based on a stroke input in a tablet (e.g., 10 in FIG. 1) environment, according to one embodiment.

Referring to FIG. 12, in a screen 1210, when execution of a voice assist function is requested in the accessibility mode, a processor (e.g., 150 in FIG. 1) may output a guide voice for guiding the execution of the voice assist function, for example, "The screen reader has been executed" through a speaker (e.g., 133 in FIG. 1).

In a screen 1220, when sensing a specified motion during the execution of the voice assist function, the processor 150 may switch the mode to the stroke input mode. The specified motion may include, for example, a long press (touch) motion of a specified region (e.g., the lower region of the display 131) in a display (e.g., 131 in FIG. 1) for a first specified time (e.g., 3 seconds).

In a screen 1230, the plurality of menu icons are displayed in the specified display 131. However, when there is no specified menu icon among the plurality of menu icons, and when sensing the first stroke input, which is input of number 8, the processor 150 may determine a first menu icon as the reference menu icon and determine the movement direction as the direction in which the sequence number increases.

In a screen 1240, the processor 150 may output information of an eighth menu icon (e.g., a name of the eighth menu icon and the like) among the plurality of menu icons through a speaker (e.g., 133 in FIG. 1). The processor 150 may highlight (e.g., outline) a specified menu icon 1241 and display the highlighted specified menu icon 1241 on the display 131.

Figure 13:
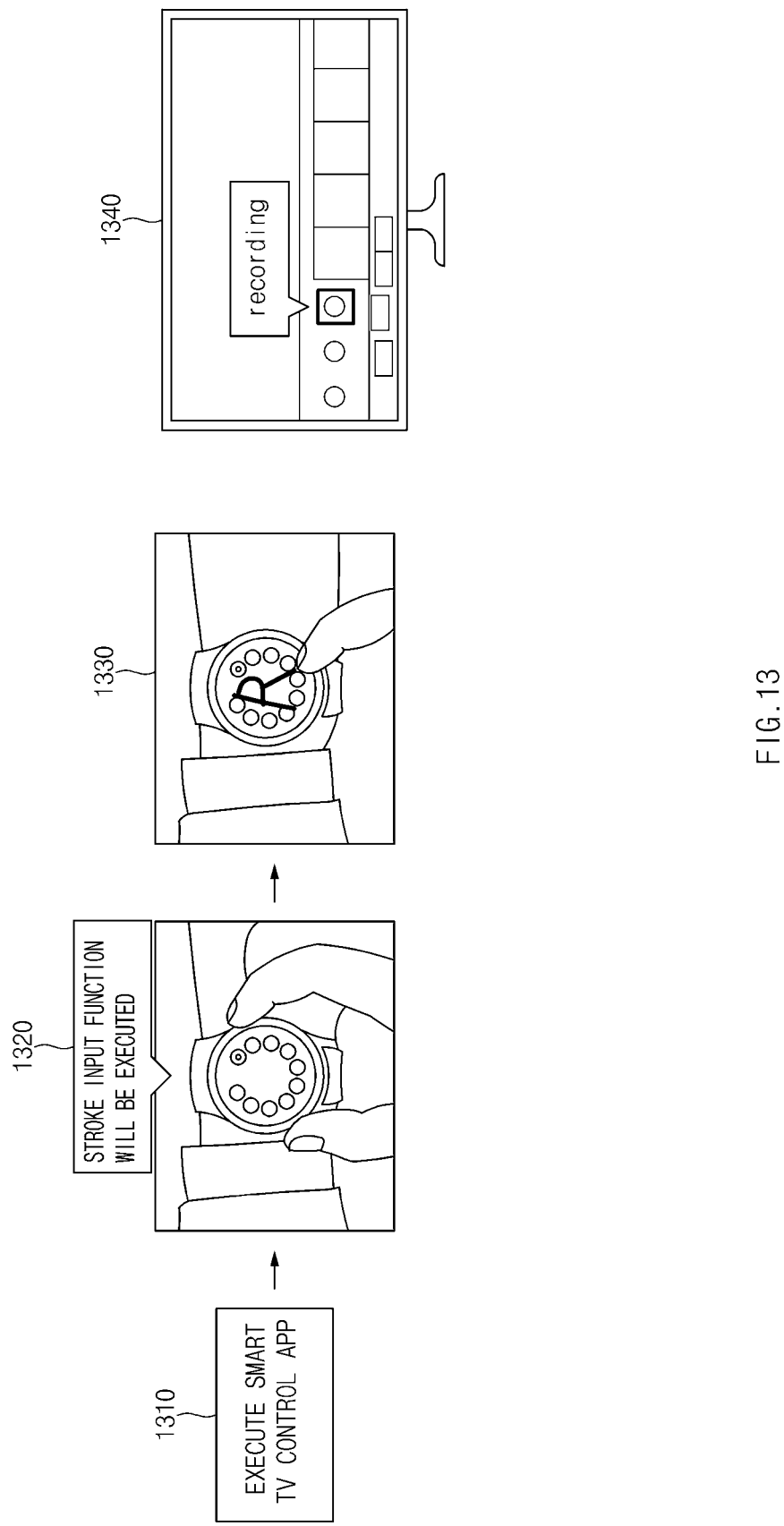
FIG. 13 shows a UI screen of a function execution process based on a fifth stroke input in a smart watch environment, according to one embodiment.

FIG. 13 shows a UI screen of a function execution process based on a fifth stroke input in a smart watch (e.g., 10 in FIG. 1) environment, according to one embodiment.

Referring to FIG. 13, in operation 1310, a processor (e.g., 150 in FIG. 1) may execute a TV control app in a state in which the smart watch and a smart TV are connected to each other in response to a user input. When the TV control app is executed, the processor 150 may guide the user that the TV control app is being executed.

In operation 1320, when a specified motion is input, the processor 150 may switch the mode to the stroke input mode. The processor 150 may output a guide voice indicating that the mode is switched to the stroke input mode, for example, "The stroke input function will be executed" through the speaker 133.

In operation 1330, when the second stroke input 'R' is input, the processor 150 may execute a function specified for the 'R' among functions of the TV control app. For example, the processor 150 may transmit a command requesting a recording function to the smart TV in a specified communication scheme (e.g., the Bluetooth communication) through a communication circuit (e.g., 120 in FIG. 1).

According to an embodiment, an electronic device (e.g., the electronic device 10 in FIG. 1) may include at least one sensor (e.g., the sensor 110 in FIG. 1), a touchscreen display (e.g., the display 131 in FIG. 1), a speaker (e.g., the speaker 133 in FIG. 1), and a processor (e.g., the processor 150) operatively connected to the at least one sensor and the touchscreen display. The processor may determine whether there is an application being executed when sensing a stroke input using at least one of the at least one sensor and the touchscreen display, identify a function corresponding to the stroke input among functions corresponding to the application being executed, execute the identified function, and output audio information associated with the identified function.

According to an embodiment, an electronic device (e.g., the electronic device 10 in FIG. 1) may include at least one sensor (e.g., the sensor 110 in FIG. 1), a touchscreen display (e.g., the display 131 in FIG. 1), a speaker (e.g., the speaker 133 in FIG. 1), and a processor (e.g., the processor 150) operatively connected to the at least one sensor and the touchscreen display. The processor may, when sensing the stroke input using at least one of the at least one sensor and the touchscreen display in a state in which a specified event has occurred, execute a function corresponding to the stroke input among functions corresponding to the specified event.

According to an embodiment, an electronic device (e.g., the electronic device 10 in FIG. 1) may include at least one sensor (e.g., the sensor 110 in FIG. 1), a touchscreen display (e.g., the display 131 in FIG. 1), a speaker (e.g., the speaker 133 in FIG. 1), a communication circuit (e.g., the communication circuit 120 in FIG. 1) capable of identifying a current position, and a processor (e.g., the processor 150) operatively connected to the at least one sensor and the touchscreen display. The processor may identify the current position using the communication circuit when sensing a stroke input using at least one of the at least one sensor and the touchscreen display, and when the current position is a specified position, execute a function corresponding to the specified position among functions corresponding to the stroke input.

According to an embodiment, an electronic device (e.g., the electronic device 10 in FIG. 1) may include at least one sensor (e.g., the sensor 110 in FIG. 1), a touchscreen display (e.g., the display 131 in FIG. 1), a speaker (e.g., the speaker 133 in FIG. 1), a communication circuit (e.g., the communication circuit 120 in FIG. 1) capable of communicating with an external electronic device, and a processor (e.g., the processor 150) operatively connected to the at least one sensor and the touchscreen display. The processor may, when sensing a stroke input using at least one of the at least one sensor and the touchscreen display in a state of being connected to the external electronic device, specify or execute a function corresponding to the stroke input among functions for the external electronic device.

Figure 14:
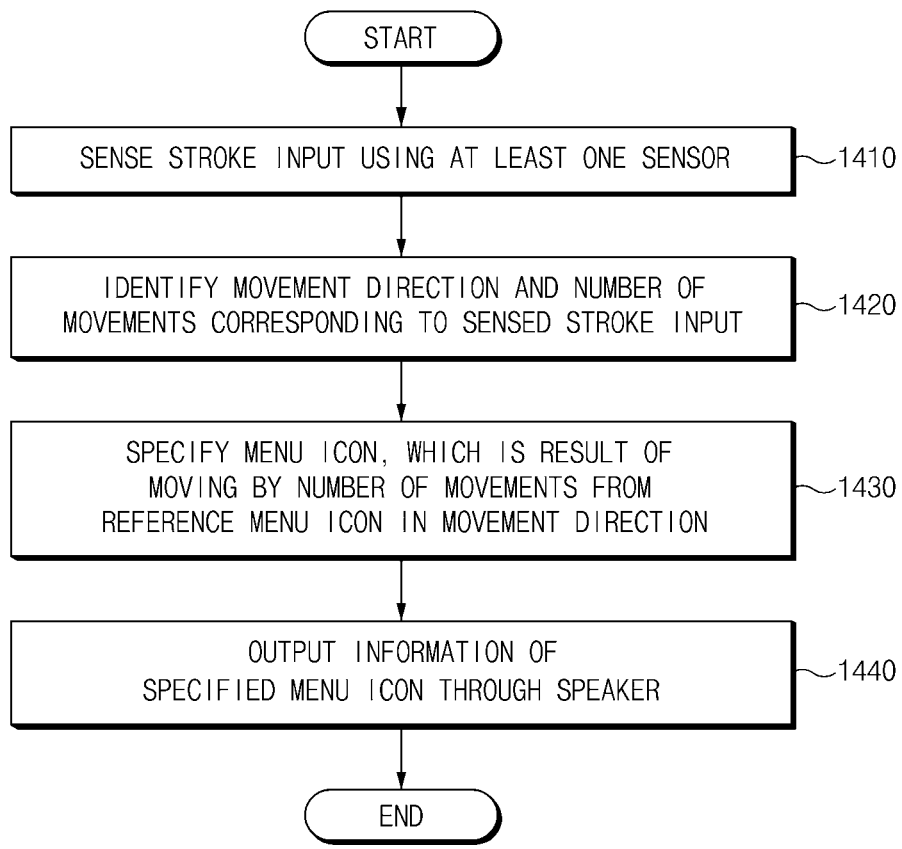
FIG. 14 is a flowchart showing a method for executing a function based on a stroke input, according to one embodiment.

FIG. 14 is a flowchart showing a method for executing a function based on a stroke input, according to one embodiment.

Referring to FIG. 14, in operation 1410, a processor (e.g., 150 in FIG. 1) may sense the stroke input using the at least one sensor 110.

In operation 1420, the processor 150 may identify a movement direction and the number of movements corresponding to the sensed stroke input.

In operation 1430, the processor 150 may specify a menu icon, which is a result of moving by the number of movements in the movement direction from the reference menu icon among the plurality of menu icons displayed on a display (e.g., 131 in FIG. 1) that respectively having the sequence numbers.

In operation 1440, the processor 150 may output information of the specified menu icon through a speaker (e.g., 133 in FIG. 1).

According to an embodiment, a method for executing, by at least one processor, a function based on a stroke input includes outputting a plurality of menu icons respectively having sequence numbers on a touchscreen display, sensing the stroke input using at least one of at least one sensor and the touchscreen display, identifying a movement direction and the number of movements on a screen output on the touchscreen display in response to the sensed stroke input, specifying a menu icon corresponding to a result of moving by the number of movements from a reference menu icon among the plurality of menu icons in the movement direction, and outputting information of the specified menu icon through a speaker.

The sensing of the stroke input may include switching a mode to a stroke input mode when sensing a specified motion input of the external object using at least one of the at least one sensor and the touchscreen display, and sensing the stroke input using at least one of the at least one sensor and the touchscreen display in the stroke input mode.

The specifying of the menu icon may include determining whether there is a previously specified menu icon among the plurality of menu icons, determining a first menu icon among the plurality of menu icons as the reference menu icon when there is no previously specified menu icon, and determining the previously specified menu icon as the reference menu icon when the previously specified menu icon is present.

The specifying of the menu icon may include determining whether there is a previously specified menu icon among the plurality of menu icons when information corresponding to a number is contained in the stroke input, determining a result of subtracting a specified number from the number as the number of movements when there is no previously specified menu icon, and determining the number as the number of movements when the previously specified menu icon is present.

The specifying of the menu icon may include, when the sensed stroke input contains information for specifying the movement direction, differently applying the movement direction based on the information for specifying the movement direction.

The method for executing the function may further include, when the sensed stroke input contains an alphabet or a Hangul initial consonant, identifying at least one menu icon starting with the alphabet or the Hangul initial consonant among the plurality of menu icons, and determine one of the at least one menu icon as the specified menu icon.

The determining of the specified menu icon may include, when there is a previously specified menu icon among the at least one menu icon, determine a menu icon of a following sequence number of the previously specified menu icon among the at least one menu icon as the specified menu icon.

Figure 15:
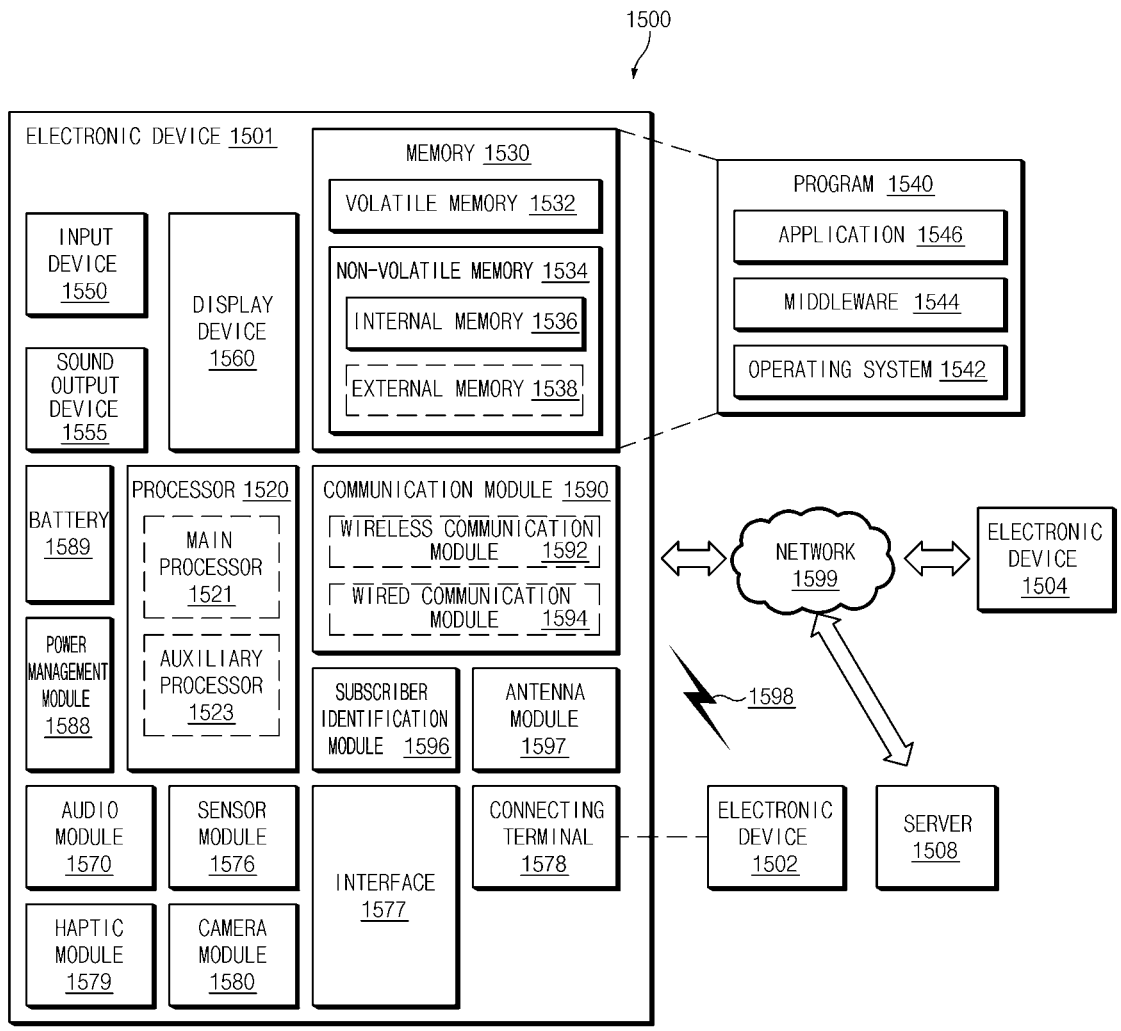
FIG. 15 shows a block diagram of an electronic device that executes a function based on a stroke input in a network environment, according to various embodiments.

FIG. 15 shows a block diagram of an electronic device 1501 that executes a function based on a stroke input in a network environment 1500, according to various embodiments.

Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580 of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540 to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590 in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590 among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590 operatively related to the auxiliary processor 1523.

The memory 1530 may store various data used by at least one component (e.g., the processor 1520 or the sensor module 1576) of the electronic device 1501. The various data may include, for example, software (e.g., the program 1540 and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by another component (e.g., the processor 1520 of the electronic device 1501, from the outside (e.g., a user) of the electronic device 1501. The input device 1550 may include, for example, a microphone, a mouse, or a keyboard.

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include one or more antennas, and, therefrom, at least one antenna appropriate for a communication scheme used in the communication network, such as the first network 1598 or the second network 1599, may be selected, for example, by the communication module 1590 (e.g., the wireless communication module 1592). The signal or the power may then be transmitted or received between the communication module 1590 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, when the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that when an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540 including one or more instructions that are stored in a storage medium (e.g., internal memory 1536 or external memory 1538) that is readable by a machine (e.g., the electronic device 1501). For example, a processor (e.g., the processor 1520 of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked.

The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. When distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
at least one sensor;
a touchscreen display;
a speaker; and
a processor operatively connected to the at least one sensor and the touchscreen display, wherein the processor is configured to:
output a plurality of menu icons respectively having sequence numbers on the touchscreen display;
sense a stroke input using at least one of the at least one sensor and the touchscreen display;
identify a movement direction and a number of movements on a screen output on the touchscreen display in response to the sensed stroke input;
specify a menu icon corresponding to a result of moving by the number of movements from a reference menu icon among the plurality of menu icons in the movement direction, wherein the moving includes a shift in a sequence number indicating the menu icon, wherein the number of movements includes a sequence number difference between the reference menu icon and the specified menu icon; and
output information of the specified menu icon through the speaker.

2. The electronic device of claim 1, wherein the processor is configured to:
switch a mode to a stroke input mode when sensing a specified motion input of an external object using at least one of the at least one sensor and the touchscreen display; and
sense the stroke input using at least one of the at least one sensor and the touchscreen display in the stroke input mode.

3. The electronic device of claim 1, wherein the processor is configured to:
determine whether there is a previously specified menu icon among the plurality of menu icons; and
determine a first menu icon among the plurality of menu icons as the reference menu icon when there is no previously specified menu icon.

4. The electronic device of claim 1, wherein the processor is configured to:
determine whether there is a previously specified menu icon among the plurality of menu icons; and
determine the previously specified menu icon as the reference menu icon when the previously specified menu icon is present.

5. The electronic device of claim 1, wherein the processor is configured to:
determine whether there is no previously specified menu icon among the plurality of menu icons when information corresponding to a number is included in the stroke input;
determine a result of subtracting a specified number from the number as the number of movements when there is no previously specified menu icon; and
determine the number as the number of movements when the previously specified menu icon is present.

6. The electronic device of claim 1, wherein the processor is configured to:
when the sensed stroke input contains information for specifying the movement direction, differently apply the movement direction based on the information for specifying the movement direction.

7. The electronic device of claim 1, wherein the processor is further configured to:
when the sensed stroke input contains an alphabet or a Hangul initial consonant, identify at least one menu icon starting with the alphabet or the Hangul initial consonant among the plurality of menu icons; and
determine one of the at least one menu icon as the specified menu icon.

8. The electronic device of claim 7, wherein the processor is configured to:
when a previously specified menu icon is present among the at least one menu icon, determine a menu icon of a following sequence number of the previously specified menu icon among the at least one menu icon as the specified menu icon.

9. The electronic device of claim 1, wherein the processor is configured to:
execute a function corresponding to the specified menu icon when sensing a motion input of an external object after sensing the stroke input; and
output audio information associated with the function through the speaker.

10. The electronic device of claim 1, wherein the processor is configured to:
when sensing a first motion input of an external object after sensing the stroke input, change the specified menu icon in response to the first motion input and output information of the changed menu icon.

11. The electronic device of claim 1, wherein the processor is configured to:
when the plurality of menu icons are menu icons contained in one of a plurality of pages respectively having different sequence numbers, and when sensing a second motion input of an external object after sensing the stroke input,
display, on the display, a page corresponding to a result of moving by the number of movements based on at least one input in a movement direction based on the second motion input; and
output information of the displayed page through the speaker.

12. The electronic device of claim 1, wherein the processor is configured to:
selectively execute at least one of specifying a menu icon or moving a page based on a change in sense area between the stroke input and a second motion input or the movement direction of the second motion input.

13. A method for executing, by at least one processor, a function based on a stroke input, the method comprising:
outputting a plurality of menu icons respectively having sequence numbers on a touchscreen display;
sensing the stroke input using at least one of at least one sensor and the touchscreen display;
identifying a movement direction and a number of movements on a screen output on the touchscreen display in response to the sensed stroke input;
specifying a menu icon corresponding to a result of moving by the number of movements from a reference menu icon among the plurality of menu icons in the movement direction, wherein the moving includes a shift in a sequence number indicating the menu icon, wherein the number of movements includes a sequence number difference between the reference menu icon and the specified menu icon; and
outputting information of the specified menu icon through a speaker.

14. The method of claim 13, wherein the sensing of the stroke input includes:
switching a mode to a stroke input mode when sensing a specified motion input of an external object using at least one of the at least one sensor and the touchscreen display; and
sensing the stroke input using at least one of the at least one sensor and the touchscreen display in the stroke input mode.

15. The method of claim 13, wherein the specifying of the menu icon includes:
determining whether there is a previously specified menu icon among the plurality of menu icons;
determining a first menu icon among the plurality of menu icons as the reference menu icon when there is no previously specified menu icon; and
determining the previously specified menu icon as the reference menu icon when the previously specified menu icon is present.

* * * * *